(12) United States Patent
Josefsberg et al.

(10) Patent No.: US 8,966,121 B2
(45) Date of Patent: Feb. 24, 2015

(54) CLIENT-SIDE MANAGEMENT OF DOMAIN NAME INFORMATION

(75) Inventors: Arne Josefsberg, Medina, WA (US); John D Dunagan, Bellevue, WA (US); Mark D. Scheibel, Kirkland, WA (US); Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 12/041,608

(22) Filed: Mar. 3, 2008

(65) Prior Publication Data

US 2009/0222584 A1   Sep. 3, 2009

(51) Int. Cl.
*G06F 15/16* (2006.01)
*H04L 29/12* (2006.01)

(52) U.S. Cl.
CPC ...... *H04L 61/1511* (2013.01); *H04L 29/12066* (2013.01); *H04L 29/12811* (2013.01); *H04L 61/6009* (2013.01)
USPC ............................ 709/245; 709/220; 709/222

(58) Field of Classification Search
CPC ..................... H04L 29/12066; H04L 61/6009; H04L 61/1511; H04L 29/12811
USPC ......................................... 709/220–222, 245
See application file for complete search history.

(56) References Cited

U.S. PATENT DOCUMENTS

| | | | |
|---|---|---|---|
| 5,428,546 A | 6/1995 | Shah et al. | |
| 5,802,492 A | 9/1998 | DeLorme et al. | |
| 5,845,227 A | 12/1998 | Peterson | |
| 5,904,727 A | 5/1999 | Prabhakaran | |
| 6,023,241 A | 2/2000 | Clapper | |
| 6,091,359 A | 7/2000 | Geier | |
| 6,091,956 A | 7/2000 | Hollenberg | |

(Continued)

FOREIGN PATENT DOCUMENTS

| | | |
|---|---|---|
| JP | 2002140362 | 5/2002 |
| JP | 2002304408 A | 10/2002 |

(Continued)

OTHER PUBLICATIONS

"Flow Control Platform (FCP) Solutions", at <<http://k2colocation.com/network-services/fcp.cfm>>, K2 Colocation, 2005, pp. 2.

(Continued)

*Primary Examiner* — Kenneth Coulter
(74) *Attorney, Agent, or Firm* — Heikki Einola; Judy Yee; Micky Minhas

(57) ABSTRACT

An exemplary method includes booting a computing device, in response to the booting, accessing a file that includes domain names and resolving at least one of the domain names by issuing a request to a server where the resolving occurs as a background process. An exemplary method includes receiving a notice to invalidate client DNS resolver cache information for a domain name, accessing a list of client subscribers to an invalidation service for the domain name and issuing an instruction to the client subscribers to invalidate their respective client DNS resolver cache information for the domain name. An exemplary method includes receiving a request to resolve a domain name, resolving the domain name and transmitting information for the resolved domain name and additional information for at least one other domain name. Other methods, devices and systems are also disclosed.

19 Claims, 13 Drawing Sheets

(56) References Cited

U.S. PATENT DOCUMENTS

| | | | |
|---|---|---|---|
| 6,122,628 A | 9/2000 | Castelli et al. |
| 6,128,279 A | 10/2000 | O'Neil et al. |
| 6,219,662 B1 | 4/2001 | Fuh et al. |
| 6,243,647 B1 | 6/2001 | Berstis et al. |
| 6,317,684 B1 | 11/2001 | Roeseler et al. |
| 6,317,686 B1 | 11/2001 | Ran |
| 6,351,775 B1 | 2/2002 | Yu |
| 6,356,838 B1 | 3/2002 | Paul |
| 6,385,539 B1 | 5/2002 | Wilson et al. |
| 6,411,897 B1 | 6/2002 | Gaspard, II |
| 6,424,370 B1 | 7/2002 | Courtney |
| 6,427,122 B1 | 7/2002 | Lin |
| 6,430,547 B1 | 8/2002 | Busche et al. |
| 6,446,121 B1 | 9/2002 | Shah et al. |
| 6,493,650 B1 | 12/2002 | Rodgers et al. |
| 6,496,814 B1 | 12/2002 | Busche |
| 6,513,026 B1 | 1/2003 | Horvitz et al. |
| 6,516,272 B2 | 2/2003 | Lin |
| 6,553,310 B1 | 4/2003 | Lopke |
| 6,584,401 B2 | 6/2003 | Kirshenbaum et al. |
| 6,606,643 B1 | 8/2003 | Emens et al. |
| 6,611,881 B1 | 8/2003 | Gottfurcht et al. |
| 6,615,130 B2 | 9/2003 | Myr |
| 6,618,507 B1 | 9/2003 | Divakaran et al. |
| 6,625,319 B1 | 9/2003 | Krishnamachari |
| 6,724,733 B1 | 4/2004 | Schuba et al. |
| 6,732,120 B1 | 5/2004 | Du |
| 6,785,704 B1 | 8/2004 | McCanne |
| 6,816,779 B2 | 11/2004 | Chen et al. |
| 6,904,160 B2 | 6/2005 | Burgess |
| 6,919,842 B2 | 7/2005 | Cho |
| 6,925,447 B2 | 8/2005 | McMenimen et al. |
| 6,965,827 B1 | 11/2005 | Wolfson |
| 6,970,884 B2 | 11/2005 | Aggarwal |
| 6,981,055 B1 | 12/2005 | Ahuja et al. |
| 7,003,555 B1 | 2/2006 | Jungck |
| 7,013,290 B2 | 3/2006 | Ananian |
| 7,013,517 B2 | 3/2006 | Kropf |
| 7,031,517 B1 | 4/2006 | Le et al. |
| 7,062,562 B1 | 6/2006 | Baker et al. |
| 7,111,061 B2 | 9/2006 | Leighton et al. |
| 7,136,932 B1 | 11/2006 | Schneider |
| 7,152,118 B2 | 12/2006 | Anderson, IV et al. |
| 7,155,456 B2 | 12/2006 | Abbott, III et al. |
| 7,171,415 B2 | 1/2007 | Kan et al. |
| 7,194,552 B1 | 3/2007 | Schneider |
| 7,197,500 B1 | 3/2007 | Israni et al. |
| 7,203,693 B2 | 4/2007 | Carlbom et al. |
| 7,219,067 B1 | 5/2007 | McMullen et al. |
| 7,228,359 B1 | 6/2007 | Monteiro |
| 7,233,861 B2 | 6/2007 | Van Buer et al. |
| 7,239,962 B2 | 7/2007 | Plutowski |
| 7,281,199 B1 | 10/2007 | Nicol et al. |
| 7,284,051 B1 | 10/2007 | Okano et al. |
| 7,349,768 B2 | 3/2008 | Bruce et al. |
| 7,366,726 B2 | 4/2008 | Bellamy et al. |
| 7,389,283 B2 | 6/2008 | Adler |
| 7,395,250 B1 | 7/2008 | Aggarwal et al. |
| 7,428,551 B2 | 9/2008 | Luo et al. |
| 7,437,239 B2 | 10/2008 | Serre |
| 7,437,372 B2 | 10/2008 | Chen et al. |
| 7,447,588 B1 | 11/2008 | Xu et al. |
| 7,479,897 B2 | 1/2009 | Gertsch et al. |
| 7,493,294 B2 | 2/2009 | Flinn et al. |
| 7,519,690 B1 | 4/2009 | Barrow et al. |
| 7,548,936 B2 | 6/2009 | Liu et al. |
| 7,561,959 B2 | 7/2009 | Hopkins et al. |
| 7,574,508 B1 * | 8/2009 | Kommula ............. 709/226 |
| 7,584,159 B1 | 9/2009 | Chakrabarti et al. |
| 7,584,301 B1 * | 9/2009 | Joshi ................. 709/244 |
| 7,603,233 B2 | 10/2009 | Tashiro |
| 7,610,151 B2 | 10/2009 | Letchner et al. |
| 7,660,441 B2 | 2/2010 | Chen et al. |
| 7,685,422 B2 | 3/2010 | Isozaki et al. |
| 7,706,964 B2 | 4/2010 | Horvitz et al. |
| 7,707,314 B2 | 4/2010 | McCarthy et al. |
| 7,710,984 B2 | 5/2010 | Dunk |
| 7,739,040 B2 | 6/2010 | Horvitz |
| 7,801,842 B2 | 9/2010 | Dalton |
| 7,840,407 B2 | 11/2010 | Strope et al. |
| 7,860,891 B2 | 12/2010 | Adler et al. |
| 7,904,530 B2 | 3/2011 | Partridge et al. |
| 7,920,965 B1 | 4/2011 | Nesbitt et al. |
| 7,930,427 B2 * | 4/2011 | Josefsberg et al. ......... 709/245 |
| 7,948,400 B2 | 5/2011 | Horvitz et al. |
| 7,982,635 B2 | 7/2011 | Seong |
| 7,984,006 B2 | 7/2011 | Price |
| 7,991,879 B2 | 8/2011 | Josefsberg et al. |
| 8,060,462 B2 | 11/2011 | Flinn et al. |
| 8,117,138 B2 | 2/2012 | Apte et al. |
| 8,135,505 B2 | 3/2012 | Vengroff et al. |
| 8,190,649 B2 | 5/2012 | Bailly |
| 8,219,112 B1 | 7/2012 | Youssef et al. |
| 8,275,649 B2 | 9/2012 | Zheng et al. |
| 8,458,298 B2 * | 6/2013 | Josefsberg et al. ......... 709/220 |
| 8,562,439 B2 | 10/2013 | Shuman et al. |
| 8,577,380 B2 | 11/2013 | Frias Martinez et al. |
| 2001/0029425 A1 | 10/2001 | Myr |
| 2002/0032689 A1 | 3/2002 | Abbott, III et al. |
| 2002/0038360 A1 | 3/2002 | Andrews et al. |
| 2002/0044690 A1 | 4/2002 | Burgess |
| 2002/0052873 A1 | 5/2002 | Delgado et al. |
| 2002/0062193 A1 | 5/2002 | Lin |
| 2002/0077749 A1 | 6/2002 | Doi |
| 2002/0128768 A1 | 9/2002 | Nakano et al. |
| 2003/0053424 A1 | 3/2003 | Krishnamurthy et al. |
| 2003/0063133 A1 | 4/2003 | Foote et al. |
| 2003/0069893 A1 | 4/2003 | Kanai et al. |
| 2003/0069968 A1 | 4/2003 | O'Neil et al. |
| 2003/0139898 A1 | 7/2003 | Miller et al. |
| 2003/0140040 A1 | 7/2003 | Schiller |
| 2003/0195810 A1 | 10/2003 | Raghupathy et al. |
| 2003/0212689 A1 | 11/2003 | Chen et al. |
| 2003/0217070 A1 | 11/2003 | Gotoh et al. |
| 2003/0229697 A1 | 12/2003 | Borella |
| 2004/0039798 A1 * | 2/2004 | Hotz et al. .................. 709/219 |
| 2004/0064338 A1 | 4/2004 | Shiota et al. |
| 2004/0073640 A1 | 4/2004 | Martin et al. |
| 2004/0117358 A1 | 6/2004 | von Kaenel et al. |
| 2004/0196161 A1 | 10/2004 | Bell et al. |
| 2004/0198386 A1 | 10/2004 | Dupray |
| 2004/0217884 A1 | 11/2004 | Samadani et al. |
| 2004/0220965 A1 | 11/2004 | Harville et al. |
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1 | 4/2005 | Sheha et al. |
| 2005/0075782 A1 | 4/2005 | Torgunrud |
| 2005/0075784 A1 | 4/2005 | Gray et al. |
| 2005/0080554 A1 | 4/2005 | Ono et al. |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 * | 6/2006 | Smith ..................... 713/156 |
| 2006/0149464 A1 | 7/2006 | Chien |
| 2006/0155464 A1 | 7/2006 | Smartt |
| 2006/0156209 A1 | 7/2006 | Matsuura et al. |

(56) References Cited

U.S. PATENT DOCUMENTS

| | | |
|---|---|---|
| 2006/0161560 A1 | 7/2006 | Khandelwal et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1* | 9/2006 | Kappler et al. ............... 709/220 |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1* | 1/2008 | Schneider ............... 709/230 |
| 2008/0052303 A1 | 2/2008 | Adler et al. |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1* | 9/2008 | Schneider ............... 709/229 |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319648 A1 | 12/2008 | Poltorak |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1* | 1/2009 | Fang et al. ............... 709/245 |
| 2009/0063646 A1 | 3/2009 | Mitnick |
| 2009/0070035 A1 | 3/2009 | Van Buer |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1* | 1/2010 | Joshi ............... 707/5 |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0280453 A1 | 11/2011 | Chen et al. |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |
| 2012/0256770 A1 | 10/2012 | Mitchell |
| 2013/0166188 A1 | 6/2013 | Zheng et al. |
| 2014/0088791 A1 | 3/2014 | Alpert et al. |

FOREIGN PATENT DOCUMENTS

| | | | |
|---|---|---|---|
| JP | 2003044503 | A | 2/2003 |
| KR | 20050072555 | A | 7/2005 |
| KR | 20060006271 | A | 1/2006 |
| KR | 100650389 | B1 | 11/2006 |
| WO | WO2006097907 | A2 | 9/2006 |
| WO | WO2007087615 | A2 | 8/2007 |
| WO | WO2007145625 | A1 | 12/2007 |
| WO | WO2009053411 | A1 | 4/2009 |
| WO | WO2010062726 | A2 | 6/2010 |

OTHER PUBLICATIONS

"Global Server Load Balancing for Disaster Recovery, Business Continuity, Performance Optimization and Datacenter Management", at <<http://www.zeus.com/documents/en/ZXT/ZXTM_Global_Load_Balancer.pdf>>, Zeus Technology Limited, 1995-2007, pp. 4.

Linden, "The End of Federated Search?", at <<http://glinden.blogspot.com/2007/03/end-of-federated-search.html>>, Mar. 24, 2007, pp. 9.

Domain Name System (DNS), retrieved on Apr. 29, 2008 at <<http://www.unix.org.ua/orelly/networking/firewall/ch08_10.htm>>, Unix, pp. 1-11.

Domain Name System (DNS) A Guide to TCP/IP, retrieved at <<http://web.syr.edu/~djmolta/ist452/ch_07.ppt>>, Thomson Learning Course Technology, pp. 1-56 ; 2007.

Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16; 2004.

Yegulalp, Change the Windows 2000 DNS cache, retrieved on Apr. 29, 2008 at <<http://searchwincomputing.techtarget.com/tip/0,289483,sid68_gci1039955,00,html>>, SearchWinComputing.com, pp. 1-3.

Liao, et al. "Learning and inferring transportation routines", Artificial Intelligence, vol. 171, 2007, pp. 311-331.

Office action for U.S. Appl. No. 12/037,347, mailed on Jan. 13, 2014, Zheng, et al., "System for Logging Life Experiences Using Geographic Cues", 8 pages.

Office action for U.S. Appl. No. 12/712,857, mailed on Feb. 21, 2014, Zheng, et al., "Map-Matching for Low Sampling-Rate GPS Trajectories", 15 pages.

Office action for U.S. Appl. No. 12/794,538, mailed on Nov. 25, 2013, Zheng, et al., "Searching Similar Trajectories by Locations", 18 pages.

Office action for U.S. Appl. No. 13/188,013, mailed on Nov. 15, 2011, Josefsberg et al., "Internet Location Coordinate Enhanced Domain Name System", 14 pages.

Office Action for U.S. Appl. No. 12/041,599, mailed on Feb. 9, 2012, Arne Josefsberg, "Failover in an Internet Location Coordinate Enhanced Domain Name System", 27 pgs.

Wikipedia, "Operating System", retrived from <<http://en.wikipedia.org/wiki/Operating_system>>on Oct. 8, 2010, pp. 1-pp. 17.

(56) References Cited

OTHER PUBLICATIONS

Office Action for U.S. Appl. No. 12/041,599, mailed on Jul. 25, 2011, 21 pages.

Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.

Zhang, et al., iBAT: Detecting Anomalous Taxi Trajectories from GPS Traces, Proceedings of UbiComp Sep. 2011, 10 pages.

Zhang, et al., "Mining Non-Redundant High Order Correlations in Binary Data", PVLDB '08, Aug. 23-28, 2008, Aukland, NZ, retrieved from the internet at <<http://portal.acm.org/ft_gateway.cfm?id=1453981&type=pdf&coll=GUIDE&dl=GUIDE&CFID=46278833&CFTOKEN=66094017>>, 11 pages.

Zhang, et al., Network Anomography, USENIX Association, Internet Measurement Conference 2005, pp. 317-330.

Zhang, et al., "Research on Information Fusion on Evaluation of Driver Fatigue", 2008 International Symposium on Computer Scientc and Computational Technology, Dec. 2008, pp. 151-155.

Zhao, et al., "Searching for Interacting Features", retrieved from the internet at <<http://www.public.asu.edu/~huanliu/papers/ijcai07.pdf>>, 6 pages.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.

Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.

Zheng, et al., "GeoLife: Managing and Understanding Your Past Life over Maps", IEEE Computer Society, In the Proceedings of the Ninth International Conference on Mobile Data Management, 2008, pp. 211-212, 2 pgs.

Zheng, et al., "GeoLife2.0: A Location-Based Social Networking Service", retrieved from the internet at <<http://research.microsoft.com/pubs/79441/GeoLife2.0%20A%20Location-Based%20Social%20Networking%20Service.pdf>>, 2 pages.

Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.

Zheng, Liu, Wang, Xie, "Learning Transportation Mode from Raw GPS Data for Geographic Applications on the Web", retrieved on Dec. 29, 2009 at <<http://delivery.acm.org/10.1145/1370000/1367532/p247-zheng.pdf?key1=1367532&key2=0674712621&coll=GUIDE&dl=GUIDE&CFID=68817993&CFTOKEN=12068153>>, ACM Proceeding of Conference on World Wide Web (WWW), Mobility, Apr. 21, 2008, pp. 247-256.

Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.

Zheng, et al., "Mining Interesting Locations and Travel Sequences from GPS Trajectories", retrieved on Aug. 4, 2009 at <<http://www2009.eprints.org/80/1/p791.pdf>>, ACM, WWW 2009, 2009, pp. 791-800.

Zheng, et al., Recommending friends and locations based on individual location history. In ACM Transaction on the Web, 2011, 44 pages, <<http://research.microsoft.com/pubs/122435/RecomFriend-zheng-Published.pdf>>.

Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.

Zheng, et al., T-Drive: Driving Directions based on Taxi Trajectories, In Proc. ACM SIGSPATIAL GIS 2010. ACM Press , 2010, 10 pages, <<http://www.cse.unt.edu/~huangyan/6350/paperList/T-Drive.pdf>>.

Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597&CFTOKEN=93582958>>, ACM Proceedings of Conference on Ubiquitous Computing (UbiComp), vol. 344, Sep. 21, 2008, pp. 312-321.

Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.

Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, in Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.

Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.

Eustice et al, "The Smart Party: A Personalized Location Aware Multimedia Experience", Consumer Communications and Networking Conf, Jan. 2008, 5 pgs.

Ge et al., "An Energy-Efficient Mobile Recommender System", KDD, 2010, 9 pages.

GPS Sharing, retrieved Feb. 4, 2013 at http://web.archive.org/web/20071129224158/http://gpssharing.com, 2 pgs.

Hariharan et al, "NetTrust—Recommendation System for Embedding Trust in a Virtual Realm", ACM Recommender Systems, Oct. 2007, 6 pgs.

Intl Search Report for PCT/US2009/063023, mailed Jun. 10, 2010, 4 pgs.

Jarvelin et al, "Cumulated Gain Based Evaluation of IR Techniques", ACM Transactions on Information Systems, vol. 20, No. 4, Oct. 2002, 25 pgs.

Jones et al, "P3 Systems: Putting the Place Back into Social Networks", IEEE Internet Computing, Sep.-Oct. 2005, 9 pgs.

Lee et al, "Efficient Mining of User Behaviors by Temporal Mobile Access Patterns", Intl Journal of Computer Science and Network Security, vol. 7, No. 2, Feb. 2007, 7 pgs.

Linden et al, "Amazon.com Recommendations, Item to Item Collaborative Filtering", IEEE Internet Computing, Jan. and Feb. 2003, 5 pgs.

Matsuo et al, "Inferring Long Term User Properties Based on Users' Location History", Proc 20th Intl Joint Conf on Artificial Intelligence, Jan. 2007, 7 pgs.

McDonald et al, "Expertise Recommender: A Flexible Recommendation System and Architecture", CSCW 2000, Dec. 2000, 10 pgs.

Michael et al, "Location Based Intelligence—Modeling Behavior in Humans Using GPS", Proc Intl Symposium on Technology and Society, Jun. 2006, 8 pgs.

Office action for U.S. Appl. No. 12/712,857, mailed on Aug. 5, 2013, Zheng, et al., "Map-Matching for Low Sampling-Rate GPS Trajectories", 15 pages.

Office Action for U.S. Appl. No. 12/037,347, mailed on Aug. 17, 2011, Yu Zheng, "System for Logging Life Experiences Using Geographic Cues", 9 pgs.

(56) References Cited

OTHER PUBLICATIONS

Office action for U.S. Appl. No. 12/794,538, mailed on Sep. 13, 2013, Zheng, et al., "Searching Similar Trajectories by Locations", 12 pages.
Office action for U.S. Appl. No. 13/324,758, mailed on Jul. 11, 2013, Zheng et al., "Urban Computing of Route Oriented Vehicles", 47 pages.
Ringberg, et al., Sensitivity of PCA for Traffic Anomaly Detection, SIGMETRICS 2007, pp. 109-120.
Sarwar et al, "Application of Dimensionality Reduction in Recommender System, A Case Study", ACM WebKDD Workshop, Aug. 2000, 12 pgs.
Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.
Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.
Winogard, "Dynamic Cartograms for Navigating Geo-referenced Photographs", available at least as early as Nov. 16, 2007, at <<http://cs.stanford.edu/research/project.php?id=289>>, pp. 2.
Xie, "Understanding User Behavior Geospatially", Microsoft Research, Nov. 2008, 2 pgs.
Office action for U.S. Appl. No. 12/041,599, mailed on Sep. 21, 2012, Josefsberg et al., "Failover in an Internet Location Coordinate Enhanced Domain Name System", 9 pages.
Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.
Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.
Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, 10 pages.
Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, 12 pages.
Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.
Amato, et al., "Region Based Image Similarity Search Inspired by Text Search", retrieved from the internet at <<http://www.nmis.isti.cnr.it/amato/papers/ircdl07-1.pdf>>, 8 pages; entered Sep. 25, 2014.
Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.
Ashbrook, et al., "Using GPS to Learn Significant Locations and Predict Movement Across Multiple Users", Journal of Personal and Ubiquitous Computer Archive, vol. 7, Issue 5, Oct. 2003, 15 pages.
Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.
"Bikely Reviews", website, 2010, 1 page, retrieved on Apr. 16, 2010 at <<http://www.bikely.com/>>.
bing.com, Maps, Retrieved on Dec. 28, 2009 at <<http://cn.bing.com/ditu/>>, 2 pgs.
Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.
Borzsonyi, et al., The Skyline Operator, In Proc. ICDE 2001, IEEE Press: 421-430, <<http://ieeexplore.ieee.org/stamp/stamp.jsp?tp=&arnumber=914855>>; 2001.
Brakatsoulas, et al., "On Map-Matching Vehicle Tracking Data", VLDB Endowment, In the Proceedings of the 31st International Conference on Very Large Data Bases, Sep. 2005, pp. 853-864.
Brauckhoff, et al., Applying PCA for Traffic Anomaly Detection: Problems and Solutions, IEEE, 2009, 5 pages.
Breiman, "Bagging Pedictors", Machine Learning, vol. 24, No. 2, Aug. 1996, pp. 123-140.
Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.
Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.
Bu, et al., Efficient Anomaly Monitoring Over Moving Object Trajectory Streams, KDD 2009, ACM, 2009, 9 pages.
Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.
Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, Nov. 2005, pp. 82-89.
Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.
Chawathe, "Segment-Based Map Matching", In the Proceedings of the IEEE Intelligent Vehicles Symposium, Jun. 13-15, 2007, pp. 1190-1197.
Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.
Chen, et al., "GeoTracker Geospatial and Temporal RSS Navigation", WWW2007, May 2007, pp. 41-50.
Chen, et al., GLS-SOD: A Generalized Local Statistical Approach for Spatial Outlier Detection, Proceedings of KDD 2010, ACM, 2010, pp. 1069-1078.
Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=__ezGS62lE439__Aa1q1zZDA&usg=AFQjCNHFZScVkE4uy1b__oC-Pr4ur7K1BdQ>>, Proceedings of Conference on Very Large Data Bases (VLDB), Aug. 29-Sep. 3, 2004, pp. 792-803.
Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.
Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/__papers/sigmod299-chen.pdf>>.

(56) References Cited

OTHER PUBLICATIONS

Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.

"CRF++: Yet Another CRF Toolkit", retrieved on Jan. 18, 2008 from <<http://crfpp.sourceforge.net>>, 13 pages.

Das, et al., Anomaly Detection and Spatial-Temporal Analysis of Global Climate System, Proceedings of SensorKDD 2009, 9 pages, 2009 ACM.

Datta, et al., "Image Retrieval: Ideas, Influences, and Trends of the New Age", 2008 ACM, retrieved from the internet at <<http://infolab.stanford.edu/~wangz/project/imsearch/review/JOUR/datta.pdf>>; 2008.

Deerwester, et al., "Indexing by Latent Semantic Analysis", retrieved from the internet at <<http://citeseerx.ist.psu.edu/viewdoc/download;jsessionid=B056787B1E8B1F013D9FA98930DE10EE?doi=10.1.1.49.7546&rep=rep1&type=pdf>>; entered Sep. 25, 2014.

Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.

Dubuisson, et al., "A Modified Hausdorff Distance for Object Matching", 1994 IEEE, retrieved from the internet at <<http://ieeexplore.ieee.org/stamp/stamp.jsp?tp=&isnumber=12513&arnumber=576361>>; 1994.

Eagle, et al., Community Computing: Comparisons between Rural and Urban Societies using Mobile Phone Data, IEEE Social Computing, 144-150, <<http://reality.media.mit.edu/pdfs/Eagle_community.pdf>>; entered Sep. 25, 2014.

Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.

Estivill-Castro, Lee, "Data Mining Techniques for Autonomous Exploration of Large Volumes of Geo-referenced Crime Data", retrieved on Dec. 29, 2009 at <<http://citeseer.ist.psu.edu/cache/papers/cs/28670/ftp:zSzzSzftp.cs.newcastle.edu.auzSzpubzSztechreportszSztr2001-09.pdf/estivill-castro01data.pdf>>, Proceedings of Conference on Geocomputation, 2001, pp. 1-12.

Estkowski, No Steiner Point Subdivision Simplification is NP-Complete, In Proceedings of the 10th Canadian Conference on Computational Geometry, pp. 11-20, 1998.

Faloutsos et al, "Fast Subsequence Matching in Time-Series Databases," Proceedings of the 1994 ACM SIGMOD International Conference on Management of Data , vol. 23, No. 2, Jun. 1994, 11 pgs.

Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.

Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.

Ge, et al., Top-Eye: Top-k Evolving Trajectory Outlier Detection, Proceedings of CIKM 2010, Toronto, Canada, 4 pages ; 2010.

Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.

Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.

Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.

Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.

Gonzalez, Hidalgo, Barabasi, "Understanding individual human mobility patterns Supplementary Material", retrieved on Dec. 29, 2009 at<<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.

"GPS Track Route Exchange Forum", 2010 GPSXchange.com website, 3 pages, retrieved on Apr. 16, 2010 at <<http://www.gpsxchange.com/phpBB2/index.php>>.

Graham, "GPS Gadgets Can Reveal More Than Your Location", Retrieved on Nov. 28, 2011 at <<http://www.google.com/∩sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aql=&gs_sm=d&gs_upl=2870I6708I0I10140I2I2I0I0I0I0I266I438I0.1.1I2I0&bav=on.2,or.r_gc.r_pw.,cf.osb&fp=533a712cc6ce8ba0&biw=1280&bih=808>>, 2008, pp. 1-2.

Greenfeld, "Matching GPS Observations to Locations on a Digital Map", In the Proceedings of the 81st Annual Meeting of the Transportation Research Board, Washington DC, Jan. 2002, 13 pgs.

Guehnemann, et al., Monitoring traffic and emissions by floating car data. Institute of transport studies Australia; 2004, <<http://elib.dlr.de/6675/1/its_wp_04-07.pdf>>.

Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.

Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.

Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfIGS6uRPJH0_AaCplCHDQ&usg=AFQjCNFtQttNVHCKYJQZcH052-KmCxlZ0g>>, ACM, Proceedings of Conference on Management of Data,1984, pp. 47-57.

Hadjieleftheriou, et al., "Complex Spatio-Temporal Pattern Queries", Proceedings of the 31st VLDB Conference, Sep. 2005, pp. 877-888.

Hadjieleftheriou, et al., "Efficient Indexing of Spatiotemporal Objects", Proceedings of the 8th International Conference on Extending Database Technology: Advances in Database Technology, Mar. 2002, 10 pages.

Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.

Han, et al., "Predicting User' Movement with a Combination of Self-Organizing Map and Markov Model", ICANN 2006, Part II, LNCS 4132, Sep. 2006, pp. 884-893.

Hariharan, et al., "Project Lachesis: Parsing and Modeling Location Histories", ACM, in the Proceedings of GIScience, 2004, pp. 106-124.

Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.

Hirose, et al., Network Anomaly Detection based on Eigen Equation Compression, In Proceedings of the 15th SIGKDD Conference on Knowledge Discovery and Data Mining, pp. 1185-1194, 2009 ACM.

(56) References Cited

OTHER PUBLICATIONS

<<http://www.ibis.t.u-tokyo.ac.jp/yamanishi/ID361_Network_Anomaly_Detection.pdf>> ; 2009.

Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.

Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.

Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.

Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.

International Preliminary Report on Patentability cited in PCT Application No. PCT/US2009/032777 dated Sep. 10, 2010, 6 pages.

Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.

International Search Report and Written Opinion Received for PCT Application No. PCT/US2009/0327777, mailed Aug. 26, 2009, 10 pages.

International Search Report dated Aug. 19, 2009 for PCT Application No. PCT/US2009,032778, filed Jan. 31, 2009, 11 pages.

Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.

Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, 1996, pp. 261-268.

Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.

Kavouras, et al., "A Method for the Formalization and Integration of Geographic Categorizations", Draft version from the International Journal of Geographic Information Science, 16(5), 439-453, 2002, retrieved from the internet at <<http://ontogeo.ntua.gr/publications/kavouras_kokla_IGIS2002.pdf>>.

Ke, et al., "Correlated Pattern Mining in Quantitative Databases", ACM Transactions on Database Systems, vol. V, No. N, Apr. 2008, pp. 1-44, retrieved from the Internet at <<http://www.cse.ust.hk/~wilfred/paper/tods08a.pdf>>.

Ke, et al., "Efficient Correlations Search from Graph Databases", IEEE Transactions on Knowledge and Data Engineering, vol. X, No. X, XXX 200X, retrieved from the internet at <<http://www.cse.ust.hk/~wilfred/paper/tkde08a.pdf>>; entered Sep. 25, 2014.

Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.

Kostakos, et al., Urban computing to bridge online and real-world social networks. Handbook of Research on Urban Informatics, 2008, <<http://hci.uma.pt/courses/ubicomp/papers/social/kostakos-08.pdf>>.

Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.

Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.

Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.

Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.

Lafferty, et al., "Conditional Random Fields: Probabilistic Models for Segmenting and Labeling Sequence Data", Proceedings of the 18th International Conference on Machine Learning, Jun. 2001, 8 pages.

Lakhina, et al., Diagnosing Network-Wide Traffic Anomalies, in Proceedings of the SIGCOMM 2004 Conference, 12 pages, 2004 ACM ; 2004.

Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.

Lee, et al., "TraClass: Trajectory Classification Using Hierarchical Region-Based and Trajectory-Based Clustering", retrieved on Aug. 4, 2009 at <<http://www.cs.uiuc.edu/homes/hanjpdf/vldb08_jglee.pdf>>, ACM, VLDB 2008, vol. 1, Issue 1, 2008, pp. 1081-1094.

Lee, et al., Trajectory Clustering: A Partition-and-group Framework, In Proceedings of the 26th ACM SIGMOD International Conference on Management of Data 2007, pp. 593-604, 2007.

Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.

Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.

Li, et al., "A Connectivity-Based Map Matching Algorithm", AARS, Asian Journal of Geoinformatics, 2005, vol. 5, No. 3, pp. 69-76.

Li, et al., "Mining User Similarity Based on Location History", retrieved on Aug. 4, 2009 at <<http://portal.acm.org/ft_gateway.cfm?id=1463477&type=pdf&coll=GUIDE&dl=GUIDE&CFID=47485690&CFTOKEN=55940484, ACM, GIS 2008, pp. 1-10.

Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>; 2009.

Li, et al., "Traffic Density-Based Discovery of Hot Routes in Road Networks", Springer-Verlag, Advances in Spatial and Temporal Databases, 2007, pp. 441-459.

Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.

Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.

(56) References Cited

OTHER PUBLICATIONS

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.
Lippi, et al., Collective Traffic Forecasting, Proceedings of the European Conference on Machine Learning and Principles and Practice of Knowledge Discovery Database, ECML PKDD 2010, pp. 259-273, 2010.
Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.
Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.
"Share My Routes", retrieved on Apr. 15, 2010 at <<http://www.sharemyroutes.com/>>, 2010, pp. 1-2.
Shekhar et al., "A Unified Approach to Detecting Spatial Outliers", GeoInformatica 7:2, 2003, 28 pages.
Shekhar et al., "Data Mining for Selective Visualization of Large Spatial Datasets," In the Proceedings of the 14th IEEE International Conference on Tools with Artificial Intelligence, 2002, pp. 41-48.
Shekhar, et al., Unified approach to detecting spatial outliers, University of Helsinki 2007, 27 pages, <<http://www.cs.helsinki.fi/u/leino/opetus/spatial-k07/maksimainen.pdf>>.
Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLBD), vol. 1, No. 1, Aug. 24, 2008, pp. 896-908.
Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.
Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.
Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658 retrieved on Apr. 30, 2010 at <<http://www.cs.cmu.edu/-ggordon/CMU-ML-08-109.pdf>>.
"SlamXR List Routes Page by Microsoft Research Community Technologies Group", retrieved on Jan. 18, 2008 from <<http://www.msslam.com/slamxr/ListRoutes.aspx>>, 2 pages.
Sohn, et al., "Mobility Detection Using Everyday GSM Traces", retrieved on Aug. 4, 2009 at <<http://www.placelab.org/publications/pubs/mobilty-ubicomp2006.pdf>>, UBICOMP 2006, pp. 212-224.
"SportsDo", retrieved on Jan. 17, 2008 from <<http://sportsdo.net/Activity/ActivityBlog.aspx>>, 3 pages.
Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.
Strachan, et al., "gpsTunes Controlling Navigation via Audio Feedback", Proceedings of MobileHCI, Sep. 2005, 4 pages.
Sui, "Decision Support Systems Based on Knowledge Management", Proceedings of the International Conference on Services Systems and Services Management (ICSSSM'05), Jun. 2005, vol. 2, pp. 1153-1156.
Sun, et al., On Local Spatial Outliers, Technical Report No. 549, Jun. 2004, <<http://sydney.edu.au/engineering/it/research/tr/tr549.pdf>>, 9 pages.

Sun, "Outlier Detection in High Dimensional, Spatial and Sequential Data Sets", School of Information Technologies, The University of Sydney, Sep. 2006, 118 pages.
Tai et al., "Recommending Personalized Scenic Itinerary with Geo-Tagged Photos", ICME, 2008, 4 pages.
Takeuchi et al., "CityVoyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.
Takeuchi, Sugimoto, "An Outdoor Recommendation System based on User Location History", retrieved on Dec. 29, 2009 at <<http://ftp.informatik.rwth-aachen.de/Publications/CEUR-WS/Vol-149/paper14.pdf>>, In Proceedings of International Workshop on Personalized Context Modeling and Management for Ubicomp Applications (ubiPCMM), 2005, pp. 91-100.
Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.
Tezuka, et al., "Toward Tighter Integration of Web Search with a Geographic Information System", WWW2006, May 2006, 10 pages.
Theodoridis, et al., "Spatio-Temporal Indexing for Large Multimedia Applications", Proceedings of the IEEE International Conference on Multimedia Systems, Jun. 1996, 9 pages.
Theodoridis, et al., "Specifications for Efficient Indexing in Spatiotemporal Databases", Proceedings of the SDDBM'98, Jul. 1998, 10 pages.
Toyama, et al., "Geographic Location Tags on Digital Images", MM'03, Nov. 2003, 11 pages.
Tsoukatos, et al., "Efficient Mining of Spatiotemporal Patterns", SSSTD 2001, LNCS 2121, pp. 425-442, 2001, retrieved from the internet at <<http://www.springerlink.com/content/4drejf9h52hk7hv7/fulltext.pdf>>.
"Twittervision", retrieved on Jan. 18, 2008 from <<http://twittervision.com>>, 1 page.
Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2Fciteseerx.ist.psu.ed%2Fviewdoc%2Fdownload%3Fdoi%3D10.1.1.106.1984%26rep%3Drep1%26type%3Dpdf&rct=j&q=Discovering+similar+multidimensional+trajectories&ei=ivIGS6HCM4uj__ga3wOiBDQ&usg=AFQjCNG20j6K3s_WuY-VhWeDjIPYpgxv1C>>, IEEE Computer Society, Proceedings of Conference on Data Engineering (ICDE), 2002, pp. 673-684.
Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.
Wang, et al., "CLOSET+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.
Wang y et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.
Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.
Wasinger, et al., "M3I in a Pedestrian Navigation & Exploration System", Proceedings of the Fifth International Symposium on Human Computer Interaction with Mobile Devices, Sep. 2003, 5 pages.

(56) References Cited

OTHER PUBLICATIONS

Wei, et al., "A Service-Portlet Based Visual Paradigm for Personalized Convergence of Information Resources", 2nd IEEE International Conference on Computer Science and Information Technology, Aug. 2009, pp. 119-124.

"Weka 3: Data Mining Software in Java", retreived on Jan. 18, 2008 from <<http://www.cs.waikato.ac.nz/ml/weka/index_home.html>>, 1 page.

"Welcome to WalkJogRun", retreived on Jan. 17, 2008 from <<http://www.walkjogrun.net>>, 1 page.

"WikiWalki Community Trail Guide", retrieved on Jan. 17, 2008 from <<http://www.wikiwalki.com>>, 1 page.

Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.

Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 5, 2008, pp. 1-10.

Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.

Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.

Yan, et al., Discovery of frequent substructures, Wiley-Interscience, 2007, 99-113.

Yan, et al., "Feature-based Similarity Search in Graph Structures", ACM Transactions on Database Systems, vol. V, No. N, Jun. 2006, retrieved from the Internet.

Yavas, et al., "A data mining approach for location prediction in mobile environments", retrieved on Aug. 4, 2009, Elsevier B.V., 2004, pp. 121-146.

Ye et al., "Mining Individual Life Pattern Based on Location History," Tenth International Conference on Mobile Data Management: Systems, Services and Middleware, May 18-20, 2009, Taipei, 10 pages.

Yi, Jagadish, Faloutsos, "Efficient Retrieval of Similar Time Sequences under Time Warping", retrieved on Apr. 15, 2010.

Yuxiang, et al., Detecting Spatio-temporal Outliers in Climate Dataset: A Method Study, IEEE 2005, pp. 760-763.

Zhang et al., "A Taxonomy Framework for Unsupervised Outlier Detection Techniques for Multi-Type Data Sets," Technical Report TR-CTIT-07-79, Centre for Telematics and Information Technology University of Twente, Enschede, 2007, 40 pages.

Liu, et al., Uncovering cabdrivers' behavior patterns from their digital traces, Computers, Environment and Urban Systems, 2010.

Lozano, et al., Spatial-temporal Causal Modeling for Climate Change Attribution, KDD 2009, Paris France, ACM 2009, 10 pages.

Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.

Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.

Markowetz, et al., "Design and Implementation of a Geographic Search Engine", Eighth International Workshop on the Web Databases (WebDB 2005), Jun. 16-17, 2005, Baltimore, MD, retrieved from the internet at <<http://cis.poly.edu/suel/papers/geo.pdf>>.

Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.

Min-qi, et al., "An Algorithm for Spatial Outlier Detection Based on Delaunay Triangulation," In the Proceedings of the 2008 International Conference on Computational Intelligence and Security, 2008, pp. 102-107.

Mitchell, et al., "Six in the City: Introducing Real Tournament—A Mobile IPv6 Based Context-Aware Multiplayer Game", NetGames'03, May 2003, pp. 91-100.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.

Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=GUIDE&CFID=47499709&CFTOKEN=90308932>>, ACM, KDD 2009, 2009, pp. 637-645.

Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.

Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.

Nicholson, "Finding the Shortest Route Between Two Points in a Network", British Computer Society, The Computer Journal, 1966, vol. 9, No. 3, pp. 275-280.

"North York Moors and Yorkshire Wolds Mountain Bke (MTB) Routes", retrieved on Jan. 17, 2008 from <<http://www.mtb-routs.co.uk/northyorkmorrs/default.aspx>>, 4 pages.

Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.

Office action for U.S. Appl. No. 12/353,940, mailed on Mar. 4, 2014, Zheng, et al., "Detecting Spatial Outliers in a Location Entity Dataset", 10 pages.

Office action for U.S. Appl. No. 13/324,758, mailed on Jan. 18, 2013, Zheng et al., "Urban Computing of Route-Oriented Vehicles", 48 pages.

Office action for U.S. Appl. No. 12/711,130, mailed on Oct. 4, 2012, Zheng et al., "Mining Correlation Between Locations Using Location History", 15 pages.

Office action for U.S. Appl. No. 12/353,940, mailed on Nov. 2, 2012, Zheng et al., "Detecting Spatial Outliers in a Location Entity Dataset", 11 pages.

(56) References Cited

OTHER PUBLICATIONS

Office action for U.S. Appl. No. 12/794,538, mailed on Nov. 29, 2011, Zheng et al. "Searching Similar Trajectories by Locations", 10 pages.
Office action for U.S. Appl. No. 12/567,667, mailed on Dec. 19, 2012, Zheng et al., "Recommending Points of Interests in a Region ", 18 pages.
Office Action for U.S. Appl. No. 12/562,588, mailed on Dec. 8, 2011, Yu Zheng, "Mining Life Pattern Based on Location History", 31 pgs.
Office action for U.S. Appl. No. 12/567,667, mailed on Feb. 25, 2014, Zheng et al., "Recommending Points of Interests in a Region", 31 pages.
Office action for U.S. Appl. No. 12/353,940, mailed on Feb. 28, 2013, Zheng et al., "Detecting Spatial Outliers in a Location Entity Dataset", 9 pages.
Office Action for U.S. Appl. No. 12/353,940, mailed on Mar. 23, 2012, Yu Zheng, "Detecting Spatial Outliers in a Location Entity Dataset," 6 pages.
Office Action for U.S. Appl. No. 12/773,771, mailed on Mar. 26, 2012, Yu Zheng, "Collaborative Location and Activity Recommendations," 9 pages.
Office Action for U.S. Appl. No. 12/711,130, mailed on Mar. 27, 2012, Yu Zheng, "Mining Correlation Between Locations Using Location History," 14 pages.
Office action for U.S. Appl. No. 12/794,538, mailed on Apr. 22, 2014, Zheng et al., "Searching Similar Trajectories by Locations", 38 pages.
Office Action for U.S. Appl. No. 12/712,857, mailed on Jun. 6, 2014, Yu Zheng, "Map-Matching for Low-SamplingRate GPS Trajectories", 14 pages.
Office action for U.S. Appl. No. 12/712,053, mailed on Jun. 6, 2014, Zheng et al., "Route Computation Based on Route-Oriented Vehicle Trajectories", 24 pages.
Office Action for U.S. Appl. No. 12/353,940, mailed on Jul. 17, 2014, Yu Zheng, "Detecting Spatial Outliers in a Location Entity Dataset", 10 pages.
Office action for U.S. Appl. No. 12/567,667, mailed on Jul. 18, 2012, Zheng et al., "Recommending Points of Interests in a Region", 20 pages.
Office action for U.S. Appl. No. 12/712,053, mailed on Aug. 15, 2012, Zheng et al., "Route Computation Based on Route-Oriented Vehicle Trajectories", 17 pages.
Final Office Action for U.S. Appl. No. 12/567,667, mailed on Aug. 27, 2014, Yu Zheng, "Recommending Points of Interests in a Region", 7 pages.
Park et al., "Location-Based Recommendation System Using Bayesian User's Preference Model in Mobile Devices", J.Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.
Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.
Pelekis, et al., Unsupervised Trajectory Sampling, Proceedings of the European Conference on Machine Learning and Principles and Practice of Knowledge Discovery in Databases ECML PKDD 2010, pp. 17-33, 2010.
Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.
Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.
Popivanov, et al., "Similarity Search Over Time-Series Data Using Wavelets", Proceedings of the 18th International Conference on Data Engineering (ICDE'02), retrieved from the internet at <<http://infolab.usc.edu/csci599/Fall2003/Time%20Series/Similarity%20search%20over%20time-series%20data%20using%20wavelets.pdf>>.
Quddus, et al. "Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.
Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.
Rosenfeld, Connectivity in digital pictures, Journal of the ACM 17 (1): pp. 146-160, 1970.
Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.
Saltenis, "Outlier Detection Based on the Distribution of Distances between Data Points", retrieved on Dec. 12, 2008 at <<http://www.mii.lt/informatica/pdf/INFO558.pdf>>, Informatica, vol. 15, No. 3, 2004, pp. 399-410'.
Salton, et al., "A Vector Space Model for Automatic Indexing", Communications of the ACM, Nov. 1975, vol. 18, No. 11, retrieved from the internet at <<http://portal.acm.org/ft_gateway.cfm?id=361220&type=pdf&coll=GUIDE&dl=GUIDE&CFID=46278489&CFTOKEN=41877236>>.
Salton, "Dynamic Document Processing", retrieved from the internet at <<http://portal.acm.org/ft_gateway.cfm?id=361509&type=pdf&coll=GUIDE&dl=GUIDE&CFID=46278306&CFTOKEN=13271377>>.

* cited by examiner

CLIENT-SIDE MANAGEMENT OF DOMAIN NAME INFORMATION

BACKGROUND

Many applications can connect to, or require connection to, remote resources on the Internet. For example, a web browser application allows a user to enter a domain name and then access a host server associated with the domain name. While the user is normally unaware of underlying processes required to connect to the host server, the user's experience is more favorable when these processes occur quickly. Unfortunately, issues like congestion stemming from rising Internet traffic (e.g., due to web innovations, globalization and increasing connectivity to billions of people in emerging markets) can increase significantly the amount of time required for underlying processes and hence diminish the user's experience.

Various exemplary methods, devices, systems, etc., described herein pertain to techniques for client-side management of domain name information that can enhance a user's Internet experience.

SUMMARY

An exemplary method includes booting a computing device, in response to the booting, accessing a file that includes domain names and resolving at least one of the domain names by issuing a request to a server where the resolving occurs as a background process. An exemplary method includes receiving a notice to invalidate client DNS resolver cache information for a domain name, accessing a list of client subscribers to an invalidation service for the domain name and issuing an instruction to the client subscribers to invalidate their respective client DNS resolver cache information for the domain name. An exemplary method includes receiving a request to resolve a domain name, resolving the domain name and transmitting information for the resolved domain name and additional information for at least one other domain name. Other methods, devices and systems are also disclosed.

DESCRIPTION OF DRAWINGS

Non-limiting and non-exhaustive examples are described with reference to the following figures.

DETAILED DESCRIPTION

Figure 1:
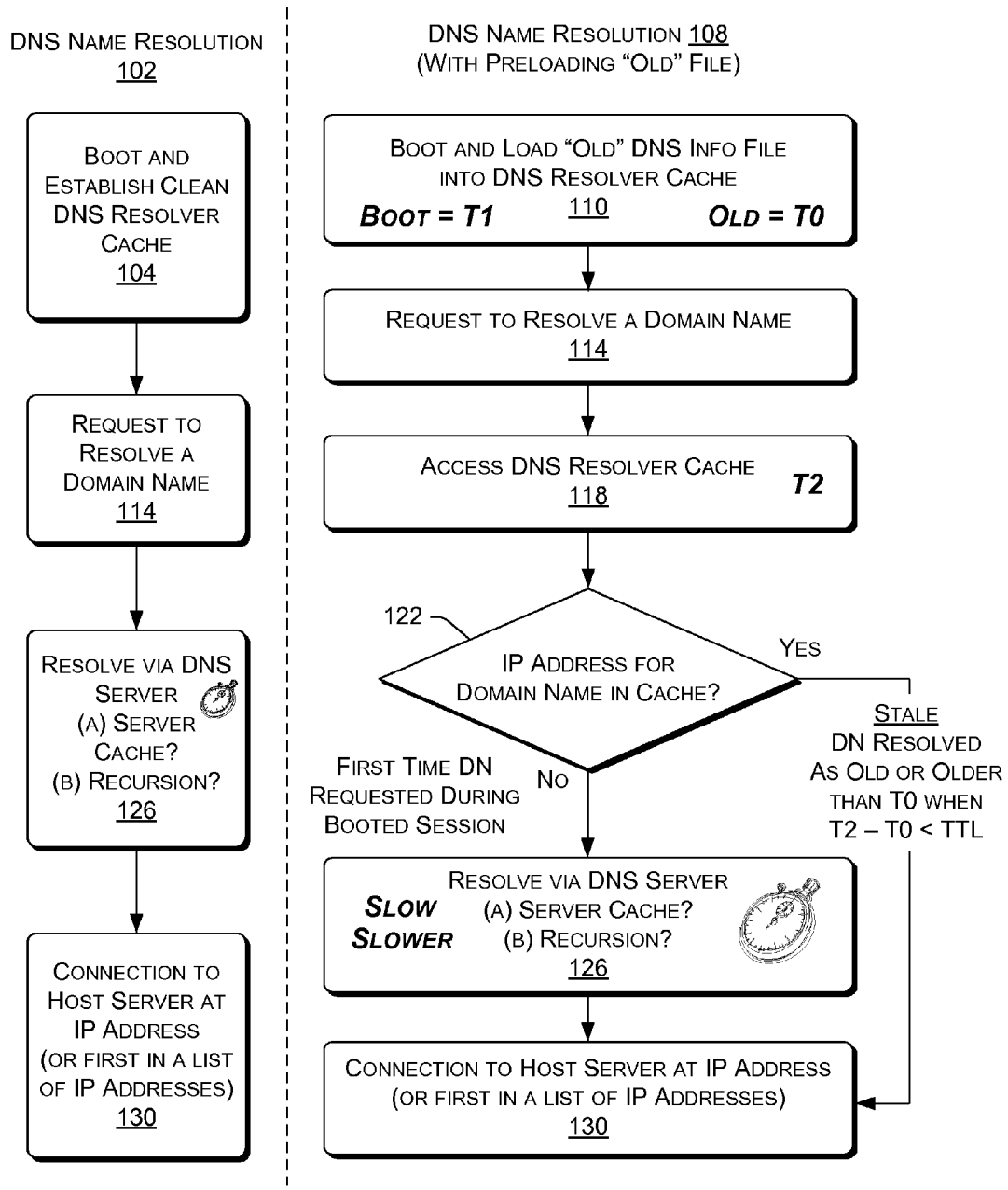
FIG. 1 is a diagram of two conventional name resolution processes.

Various exemplary methods, devices, system, etc., described herein pertain to client-side management of domain name information in a Domain Name System (DNS). Domain name information may be information as included in a DNS Resource Record (RR) and/or other information associated with a domain name. An exemplary client-side mechanism prefetches domain name information as a background process, for example, at boot during empty or unused cycles. Such a mechanism can enhance a user's experience when the user wants to connect to a host server for a domain name that the user connected to in a previous session. For example, the prefetch mechanism can access a persistent record or cache of a user's frequently requested domain names and then resolve at least some of these domain names as a background process during boot. Prefetching ensures that the client resolver cache has fresh information for the domain names and allows the user to connect to one or more appropriate host servers without having to wait for resolution by a DNS server.

Another exemplary mechanism allows for invalidation of client-side domain name information. A client-side DNS cache typically caches a Resource Record for a domain name for a period of time specified by a value, referred to as "time-to-live" (TTL). When the TTL expires, a client-side DNS service (e.g., a resolver or name resolution service) makes a request to re-resolve the domain name. As short TTLs can increase network traffic, TTLs are typically long (e.g., a day). For any of a variety of reasons, relatively instantaneous invalidation of client-side domain name may be desired. An exemplary invalidation mechanism can invalidate client-side domain name information and cause a client DNS service to request fresh information. Alternatively, such a mechanism may simultaneously invalidate and refresh client-side domain name information.

Yet another exemplary mechanism allows for management of information for groups of domain names. In general, a client wants to avoid issuing requests for name resolution as such requests increase network traffic and require action by one or more servers. An exemplary grouping mechanism allows a client to acquire information for more than one domain name when issuing a request for resolution of a single domain name.

An exemplary client architecture optionally includes a failover module that fails over a client application to a new host server. An exemplary client architecture optionally includes an Internet Location Coordinate (ILC) module that operates in conjunction with an ILC enhanced DNS system with beacons that help provide information to participants about their respective "locations" in a network space. A participant in an ILC enhanced DNS system can be any resource on the network (e.g., a client, a server, etc.). In various examples, transmission of location information (e.g., ILCs) can occur via DNS and TXT records; via "Extensions to DNS" (EDNS) and explicit new record types; or entirely outside DNS but applied to select an address returned by a DNS query.

FIG. 1 shows two conventional DNS name resolution methods 102 and 108. According to the method 102, in a boot block 104, a client computing device ("client") starts-up and establishes a clean DNS resolver cache. In a request block 114, the client makes a request to resolve a domain name. In a resolution block 126, the client transmits a message to a DNS server that, in turn, checks its server cache for information to resolve the domain name or initiates a recursion process to resolve the domain name. As a recursion process requires contacting one or more other servers, this process can be time consuming. Once the DNS server resolves the domain name, it transmits a message to the client (e.g., a DNS response containing one or more Resource Records). A connection block 130 connects the client to a host server associated with the domain name based on the information received from the DNS server.

According to the method 108, in a boot block 110, a client computing device ("client") starts-up and loads "old" DNS information from a file (e.g., written before the client shut down) into the client's DNS resolver cache. In the boot block 110, the boot time is designated T1 and the age of the "old" DNS information is designated T0, though the file will likely contain multiple domain names that were fetched at different times. In a request block 114, the client makes a request to resolve a domain name. In an access block 118, the client accesses its DNS resolver cache, which contains the "old" DNS information. A decision block 122 follows that decides if an IP address exists in the cache for the domain name. If the decision block 122 decides that no IP address exists in the cache, then the client resolves the domain name via a DNS server, per the resolution block 126 (see, e.g., description for method 102). However, if an IP address exists for the domain name in the client-side DNS resolver cache, as preloaded, then the client connects to the associated host server per the connection block 130. In this branch, the domain information will only be considered "fresh" (and hence usable) if T2−T0 is less than the TTL for that domain name, where the TTL was returned along with the domain name's IP addresses in the DNS response message.

Figure 2:
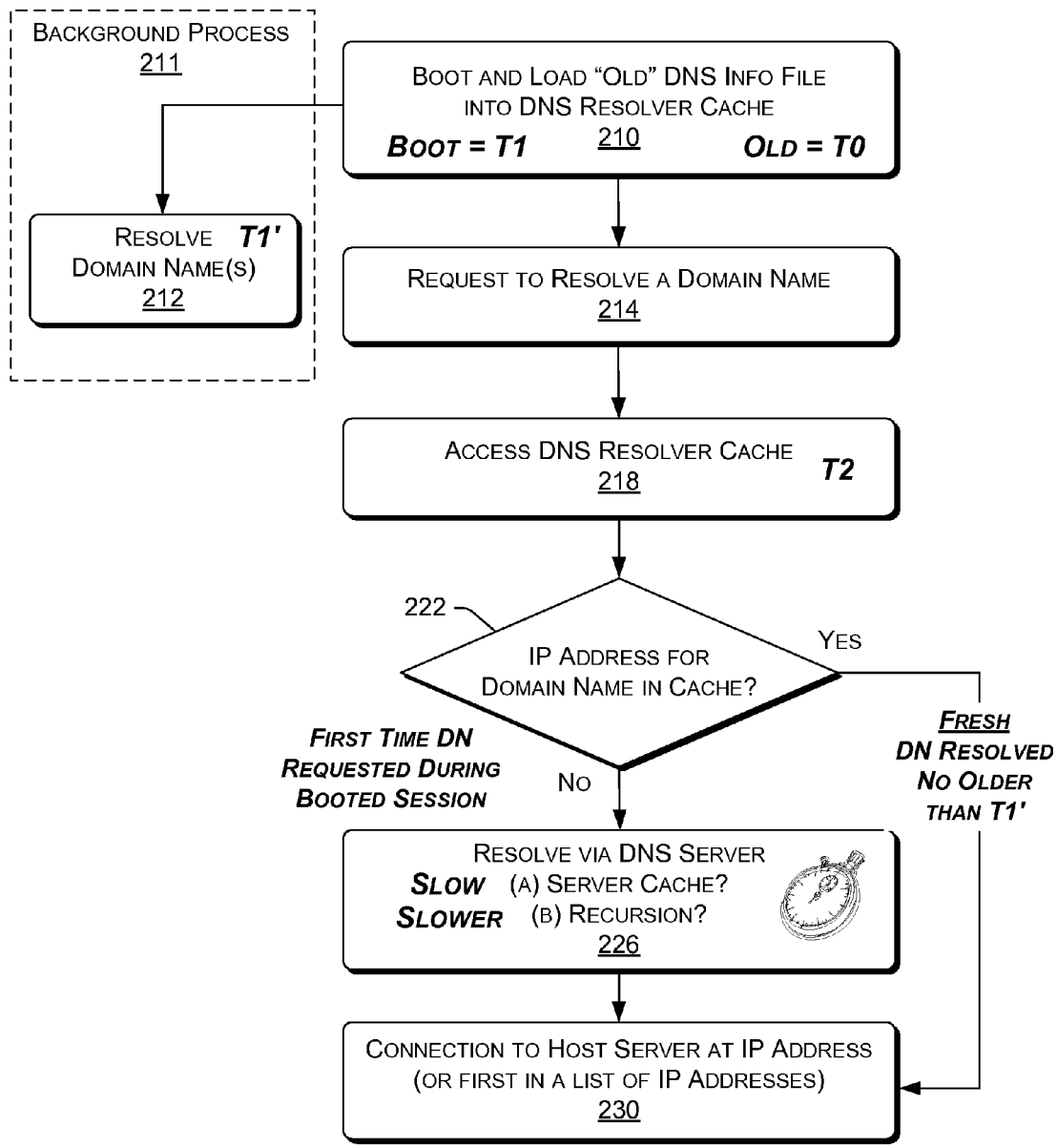
FIG. 2 is a diagram of an exemplary name resolution process that includes prefetching domain name information.

FIG. 2 shows an exemplary method 200 for DNS name resolution. The method 200 can enhance a user's experience when compared to the method 102 and the method 108. In particular, the method 200 can enhance a user's experience where the user wants to connect to resources associated with a domain name used previously (e.g., used prior to log-in, booting, etc.).

According to the method 200, in a boot block 210, a client computing device ("client") starts-up and loads "old" DNS information from a file into the client's DNS resolver cache. In the boot block 210, the boot time is designated T1 and the age of the "old" DNS information is designated T0. In the example of FIG. 2, it is assumed that the file includes, at a minimum, one or more domain names. The file may optionally include other information such as in the method 108. When the file is loaded, a background process 211 commences that includes a resolution block 212 that resolves one or more domain names included in the file. In the example of FIG. 2, the domain name information acquired for a particular domain name by the resolution block 212 is assigned a time T1'. As already explained, a name resolution process issues a request to a DNS server to, for example, acquire a Resource Record for a domain name. In turn, information received from the DNS server is loaded into the client's DNS resolver cache. The background process 211 may execute during empty or unused cycles during start-up of the client computing device or at others times during the use of the computing device. The background process 211 may be limited in terms or execution time and the number of domain names to resolve or it may be limited to increase the total DNS traffic by no more than a constant factor over what the user's actions would have naturally incurred. For example, the process 211 may be restricted to the first five minutes after boot and/or be limited to about twenty domain names. While such a process may be customized by a user, it may be programmed by default to execute automatically without user input or user awareness. The prioritization of domain names to fetch may be based on prior history of domain name requests, likely prioritizing those prior name requests that would not be served from the local DNS resolve cache if they recurred.

At some time after boot, per a request block 214, the client requests resolution of a domain name. At a time T2, where T2 is greater than T1', the client accesses its DNS resolver cache. A decision block 222 follows that decides if an IP address exists in the resolver cache for the domain name. If the decision block 222 fails to find an IP address, then a resolution block 226 resolves the domain name via a DNS server. According to this branch, the domain name was not amongst the one or more domain names resolved by the background process 211. If the decision block 222 finds an IP address for the domain name in the client's DNS resolver cache, then it is a "fresh" IP address, possibly acquired at time T1'. In other words, if the domain name specified in the request block 214 is a domain name resolved by the background process 211, then the domain name information is no older than T1'.

In comparison to the method 102, the method 200 enhances a user's experience as it can provide for quicker connections to network resources for one or more domain names. In comparison to the method 108, the method guarantees freshness of domain name information for one or more domain names.

Figure 3:
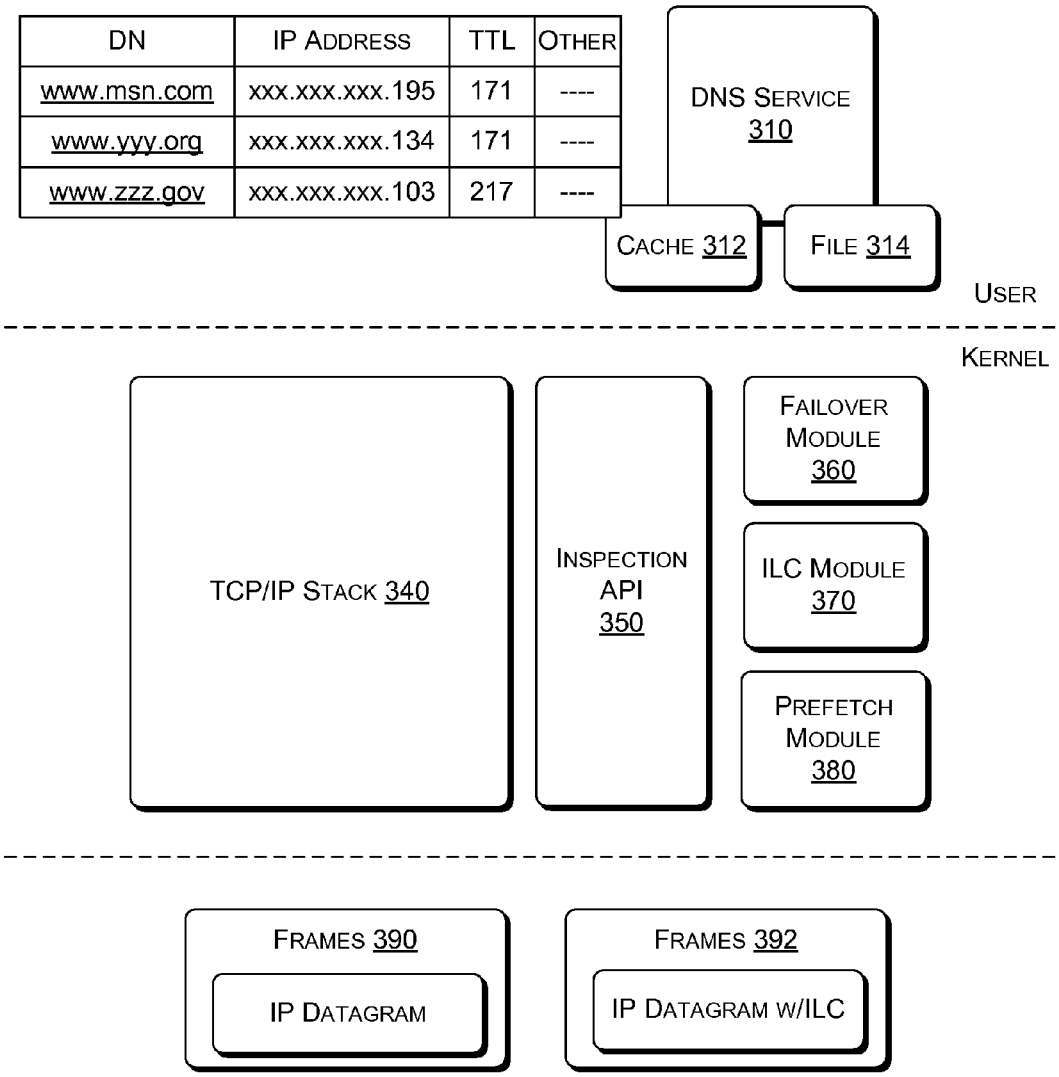
FIG. 3 is a diagram of an exemplary client-side architecture for prefetching domain name information.

FIG. 3 shows an exemplary client-side architecture 300 that includes a prefetch module configured to perform the method 200 of FIG. 2. The architecture 300 includes components in a user space and components in a kernel space. The user space includes can include applications, which may be stateless or stateful, application programming interfaces (APIs), and a DNS service 310 with an associated cache 312 and file 314 for storing information associated with domain names (e.g., IP addresses, TTL, etc). The DNS service 310 may be an OS service.

The kernel space includes various components that operate in conjunction with a TCP/IP stack 340. Such a stack typically operates via a network driver interface specification (NDIS) to communicate with network resources via frames 390, 392. The TCP/IP stack 340 includes a transport layer, a network layer and a framing layer. As shown, frame 390 carries an IP datagram and frame 392 carries an IP datagram and Internet Location Coordinate (ILC) information (see, e.g., FIGS. 4 and 5).

The architecture 300 may include the following APIs by which applications, services, or other system components access the TCP/IP stack 340:

A Kernel-Mode API used by KM clients.

Sockets API used by Sockets-based applications and services. The Sockets API operates through an Ancillary Function Driver (AFD) to perform Socket functions with the TCP/IP stack 340.

Transport Driver Interface (TDI) used by NetBIOS over TCP/IP (NetBT) clients and other legacy TDI clients. A translation layer exists between TDI and the TCP/IP stack 340.

The TCP/IP stack 340 exposes an inspection API 350, which provides a consistent, general-purpose interface to perform deep inspection or data modification of packet contents. The Inspection API 350 is part of a filtering platform. The TCP/IP stack 340 provides access to the packet processing path at the Network and Transport layers.

The architecture 300 includes an exemplary failover module 360, which may be configured in any of a variety of manners. For example, the failover module 360 may be configured to directly access information in the TCP/IP stack 340. The module 360 may be configured to use the inspection API 350. The failover module 360 may also be configured to expose an API for user space applications. The failover module 360 may be part of, or function cooperatively with, the DNS service 310. For example, the failover module 360 may be a separate OS service that can retrieve information from the resolver cache 312 or resolver file 314.

The architecture 300 also includes an ILC module 370, which provides for processing Internet Location Coordinate (ILC) information. Such information is described in more detail with respect to FIGS. 4 and 5. The ILC module 370 may be configured to operate in conjunction with the failover module 360. For example, failover may occur based at least in part on ILC information. The ILC module 370 may be part of, or function cooperatively with, the DNS service 310. For example, the ILC module 370 may store ILC information in a cache and/or a file associated with the DNS service 310.

The architecture 300 includes the exemplary prefetch module 380, which may be configured in any of a variety of manners. For example, the prefetch module 380 may be configured to directly access information in the TCP/IP stack 340. The module 380 may be configured to use the inspection API 350. The prefetch module 380 may also be configured to expose an API for user space applications. The prefetch module 380 may be part of, or function cooperatively with, the DNS service 310. For example, the prefetch module 380 may be a separate OS service that can retrieve information from the resolver cache 312 or resolver file 314. Alternatively, another cache or file may be available that maintains information between boots of a client computing device (i.e., a persistent information store).

The prefetch module 380 may be configured to operate in conjunction with the failover module 360 and/or the ILC module 370. For example, the prefetch module 380 may fetch information for use by the failover module 360 and the prefetch module 380 may fetch information based at least in part on ILC information.

Figure 4:
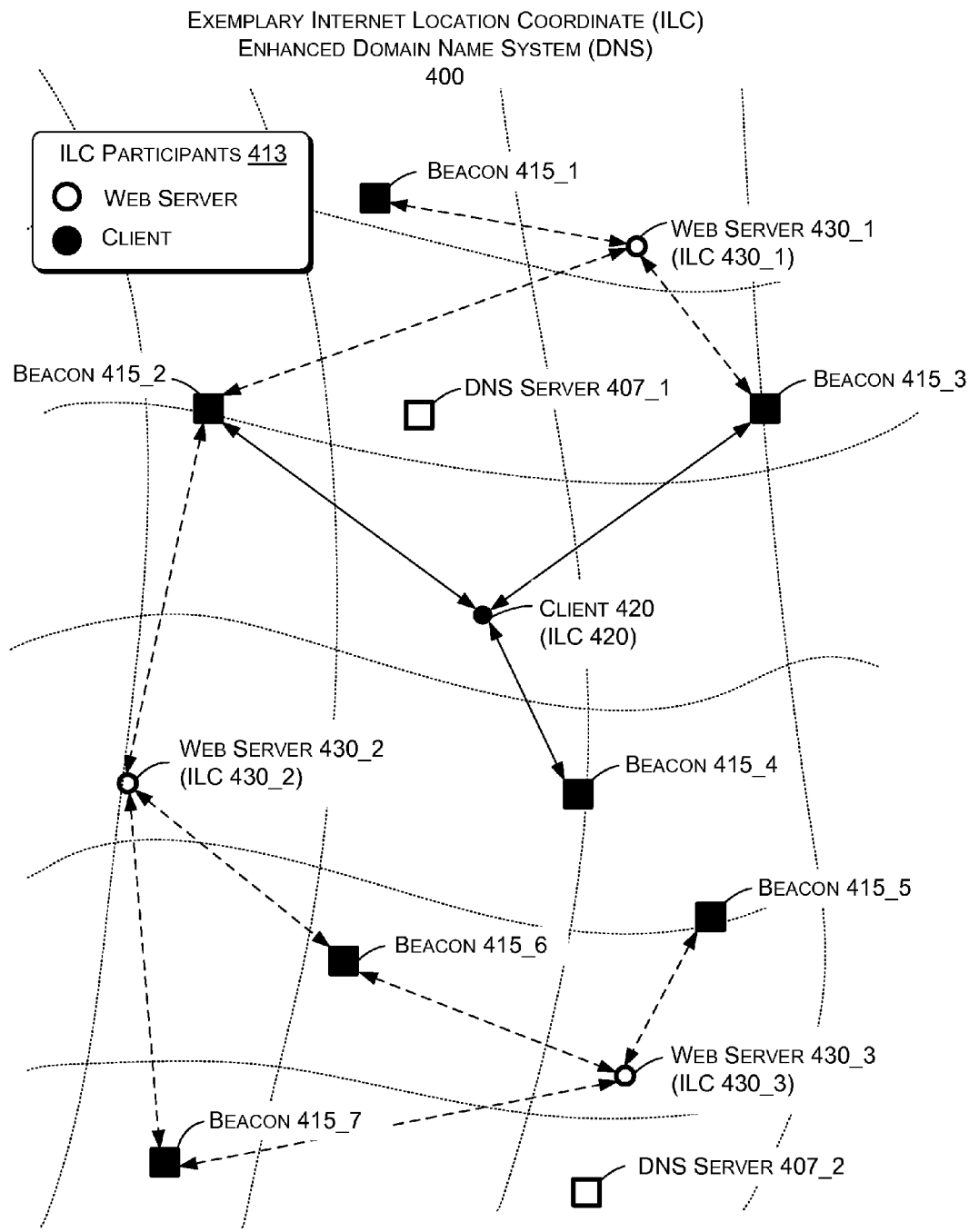
FIG. 4 is a diagram of an exemplary Internet Location Coordinate (ILC) enhanced Domain Name System (DNS)

FIG. 4 shows an exemplary Internet Location Coordinate (ILC) enhanced Domain Name System (DNS) 400. The system 400 includes DNS servers 407, beacons 415, a client 420 and web servers 430. Any resource on the Internet that can acquire an ILC may be deemed an ILC participant. For example, a box in FIG. 4 shows ILC participants 413 as including the client 420 and the web servers 430; thus, in this example, an ILC participant can be a client or a server.

The system 400 may depend on time, distance, network traffic, machine workload, bandwidth, etc. To understand better how such a system may be defined, consider a vehicle on a major interstate highway en route to an airport. At various locations along the highway, the state department of transportation transmits information to displays that provide information to vehicle operators. When the vehicle is at a display location, the department of transportation may transmit a travel time message that indicates how many minutes it will take for a vehicle at the display location to reach the airport. Such information is helpful as the vehicle operator may decide to take an alternate route. Further, the reasons for the stated travel time may be irrelevant to the vehicle operator. In other words, the vehicle operator may not care whether the travel time is lengthy due to road construction, holiday traffic, an accident, etc. While the department of transportation may choose to display a specific reason or reasons, such information may not add much value to the information conveyed by a simple travel time in minutes.

As described herein, in various examples, an Internet Location Coordinate (ILC) may be a number, a set of numbers, or a set of numbers where each one is associated with some additional information (e.g., a tuple for each beacon). An ILC may indicate a local position to a client where this position is with respect to a network logical space measuring "travel time" or congestion, and not necessarily geographic location. ILCs may be compared to estimate "travel time" or congestion between participants. Such simplicity is in-line with the DNS and such an ILC may be carried according to an existing DNS protocol.

Referring again to the system 400 of FIG. 4, the client 420 acquires information associated with three beacons 415_2, 415_3 and 415_4. For example, a beacon can act as a reflector where the client 420 can send a packet to the beacon and receive a response packet. The client 420 can then determine the round trip time (RTT) to and from a beacon (e.g., a "travel time"). As the client 420 performs the same process with multiple beacons (i.e., the beacons 415_2, 415_3 and 415_4), the client 420 becomes more aware of its surroundings. In particular, the client 420 becomes aware of its own condition in the system where its own condition may be represented according to a number or a set of numbers, etc.

As mentioned, an ILC participant can be any resource on a network. Hence, the web servers 430_1, 430_2 and 430_3 may be participants that can determine respective ILCs using the beacons 415. For example, the web server 430_1 may transmit packets to the beacons 415_1, 415_2 and 415_3 and receive corresponding return packets. As the web server 430_1 may know, a priori, information about the beacons 415_1, 415_2 and 415_3, it can now determine its position in the system (e.g., its ILC). While the example of FIG. 4 shows three beacons, other numbers of beacons may be used. Generally, two or more beacons may be used.

As described herein, the exemplary system 400 allows clients to determine their position in a network logical space. Such information can be used for a variety of purposes. For example, where the web servers 430_1, 430_2 and 430_3 provide essentially identical services, such information can be used to allow the client 420 to connect to the "best" web server (e.g., the "closest" server based on ILCs).

Figure 5:
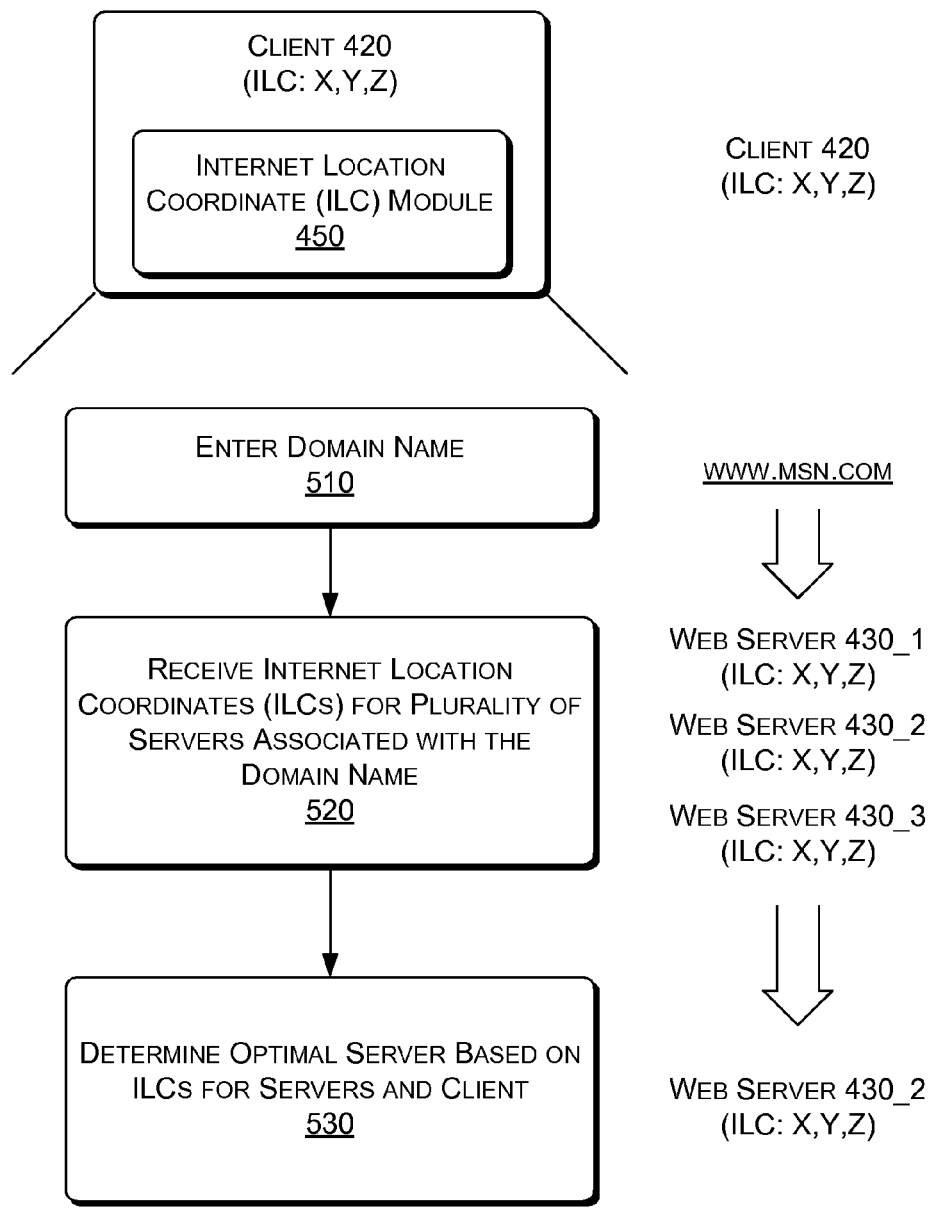
FIG. 5 is a diagram of an exemplary method for determining an optimal server for a group of servers for a domain name.

FIG. 5 shows an exemplary method 500 for determining an optimal server from a plurality of servers. In this example, the plurality of servers are participants in an ILC enhanced system. The method 500 may be implemented using a client 420 located on a network where the client 420 includes an ILC module 450; accordingly, the client 420 "knows" its ILC in the network space.

In an entry block 510, a domain name is entered (e.g., www.msn.com). In turn, a DNS server may identify a plurality of servers associated with the domain name, for example, web server 430_1, 430_2 and 430_3. As explained, each of the servers includes an ILC module to ascertain their respective ILCs. In a receipt block 520, the client 420 receives information about the group of servers along with the ILC for each of the servers in the group. In a determination block 530, the client 420 determines the optimal server based on the ILCs for the servers and its own ILC.

In the example of FIG. 5, the client 420 may be a user connected to the Internet and the domain name may be www.msn.com. This domain name has a plurality of associated servers at various geographical locations around the world. Given the exemplary architecture 400 where beacons 415 are scattered throughout the networked world, each of the servers for the www.msn.com domain name knows its own ILC. When the DNS communicates with each server, each server can respond by sending its ILC to the DNS server, which, in turn, transmits this information to the client 420. The ILC module 450 can then determine which server is the optimal server based on the client's 420 ILC and those of the servers. In general, the optimal server is the server that can provide the most efficient service to the client 420.

Figure 6:
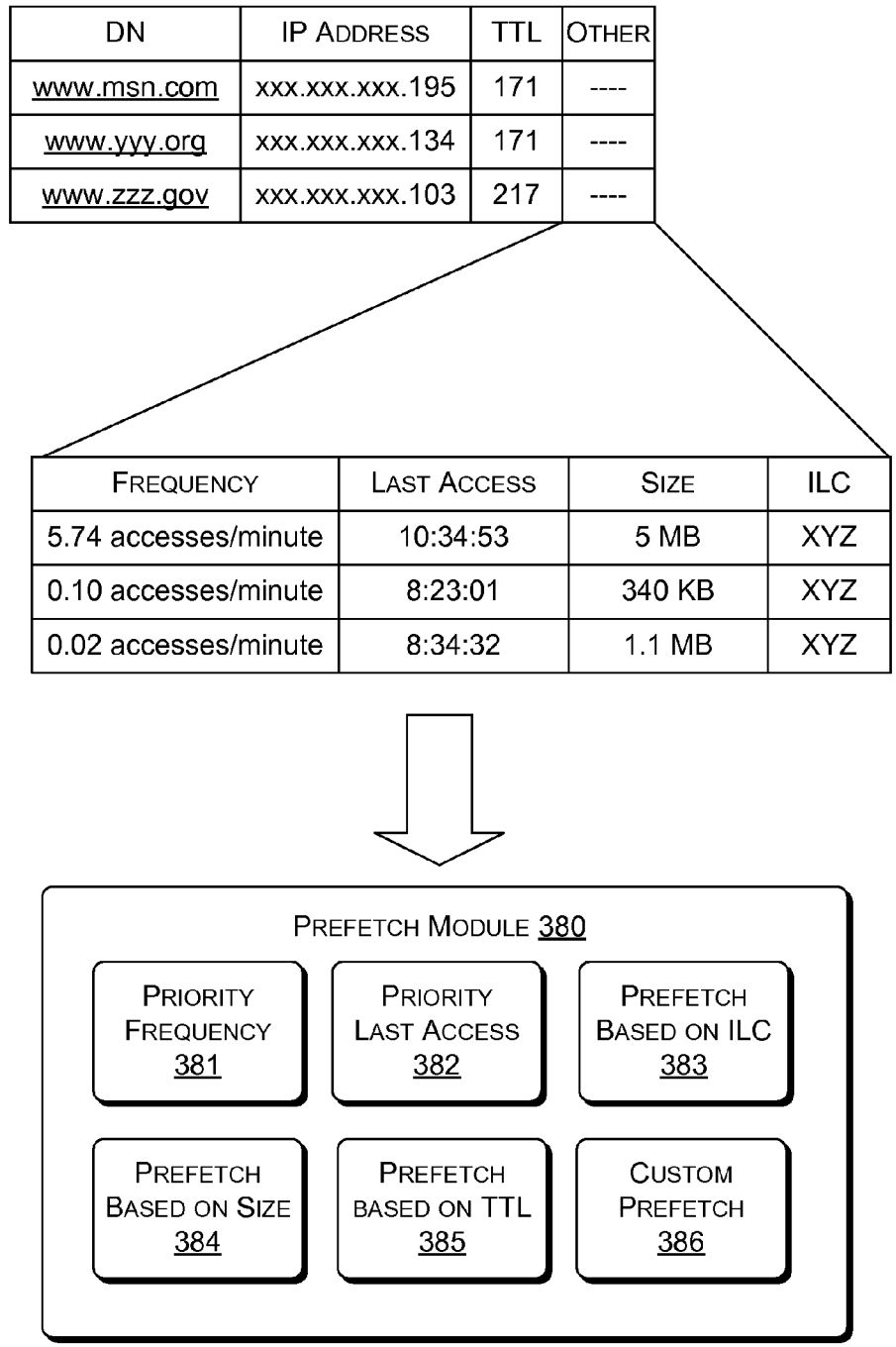
FIG. 6 is a diagram of an exemplary prefetch module of the client-side architecture of FIG. 3.

FIG. 6 shows the exemplary prefetch module 380 of FIG. 3 along with some domain name information. As mentioned, the prefetch module 380 may rely on basic information stored in a resolver cache (e.g., a Resource Record). However, the prefetch module 380 may rely on other domain name information such as, for example, frequency of use, last access time, amount of information communicated and ILC.

In the example of FIG. 6, the prefetch module 380 includes various components 381-386. A priority frequency component 381 prioritizes prefetch based on frequency information. A priority last access component 382 prioritizes prefetch based on last access time information. A prefetch based on ILC component 383 prefetches information based at least in part on ILC information. A prefetch based on size component 384 prefetches information based at least in part on amount of information communicated. For example, a client may desire quicker access to a host server where the client normally downloads many files or large files from that host server. A prefetch based on TTL component 385 prefetches information based at least in part on one or more TTLs. A custom prefetch component 386 allows a user to customize prefetch, which may rely on any of a variety of information. For example, a prefetch method may include prioritizing domain names according to their respective likelihood of being invalid on a future domain name resolution request (e.g., resolution information invalid or even domain name invalid). The component 386 may also provide an API for a user to enable/disable and/or adjust other aspects of a prefetch process.

Figure 7:
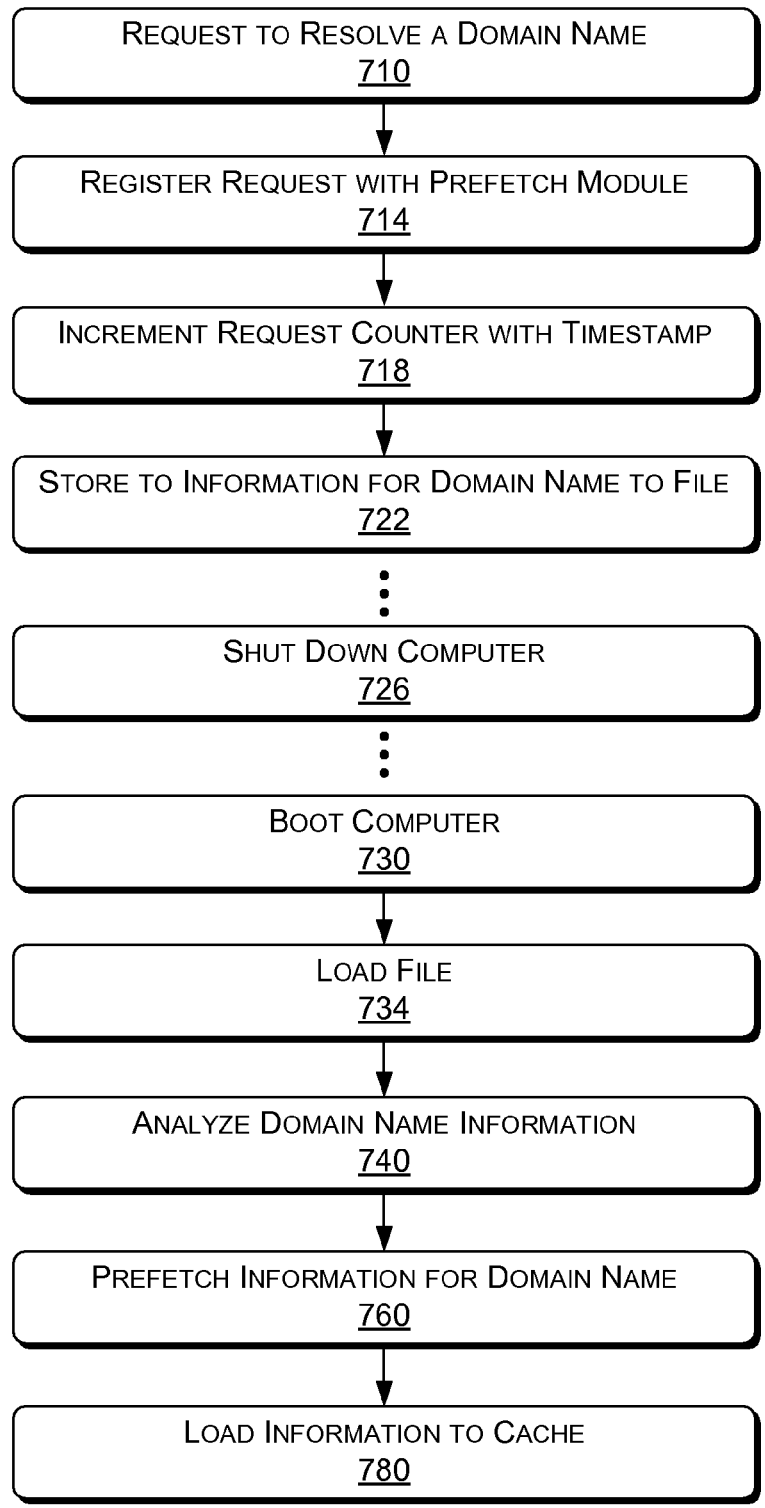
FIG. 7 is a diagram of an exemplary method for prefetching domain name information.

FIG. 7 shows an exemplary method 700 for prefetching domain name information. The method 700 commences in a request block 710 that makes a request to resolve a domain name. A register block 714 registers the request with a prefetch module. An increment block 718 increments a counter that tracks a user's request frequency for the domain name and generates a timestamp or other time information for the pending request (see, e.g., components 381 and 382 of FIG. 6). A storage block 722 stores the information for the domain name to a file or other persistent store. At some subsequent time, in a shut down block 726, a computing device shuts down. While the example of FIG. 7 pertains to a complete shut down of a computing device, a partial shut down or shut down of particular networking services (e.g., DNS service) may occur.

At a later time, a boot block 730 boots the computer. Upon booting, a load block 734 is initiated that loads information from the file. An analysis block 740 analyzes information in the file, for example, to determine a prefetch order, number of domain names to prefetch, etc. A prefetch block 760 prefetches domain name information for one or more domain names (e.g., based at least in part on the analysis). For example, the prefetch block 760 may simply issue one or more domain name resolution requests to a DNS server and return a Resource Record (RR) for each domain name. A load block 780 loads the domain name information to a cache such as a client DNS resolver cache (see, e.g., the cache 312 of FIG. 3).

Figure 8:
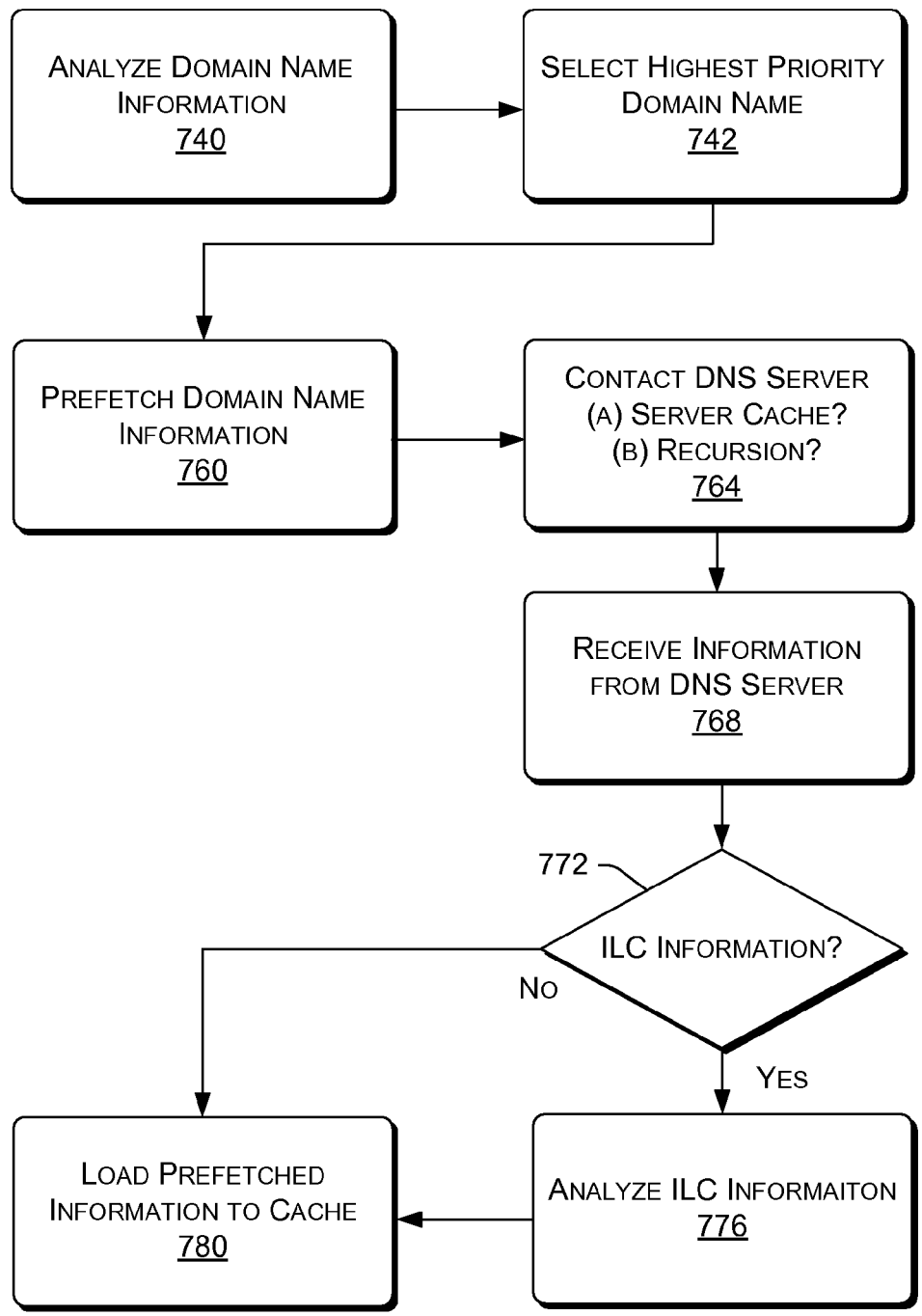
FIG. 8 is a diagram of an exemplary method for prefetching domain name information that references the method of FIG. 7.

FIG. 8 shows an exemplary method 702 that references various blocks of the method 700 of FIG. 7. In particular, the analysis block 740 may enter a priority analysis block 742 that selects a domain name having the highest priority (e.g., most frequently requested). The prefetch block 760 then prefetches information for the domain name having the highest priority. As shown, the prefetch block 760 enters a contact block 764 to contact a DNS server. In a reception block 768, information from the DNS server is received. As mentioned, prefetching may occur in an ILC enhanced DNS system (see, e.g., FIGS. 4 and 5). Thus, a decision block 772 decides whether the packet of information received from the DNS server includes ILC information. If the decision block 772 decides that ILC information is not present, then the method 702 enters the load block 780 to load the prefetched information to the cache. However, if the decision block 772 decides that ILC information is present (e.g., for a multihomed or geo-hosted web service), then an analysis block 776 analyzes the ILC information. For example, the analysis block 776 may analyze the ILC information to determine an optimal server, as explained with respect the method 500 of FIG. 5. Once an optimal server is selected, the method 702 continues at the load block to load the appropriate information into the cache.

Figure 9:
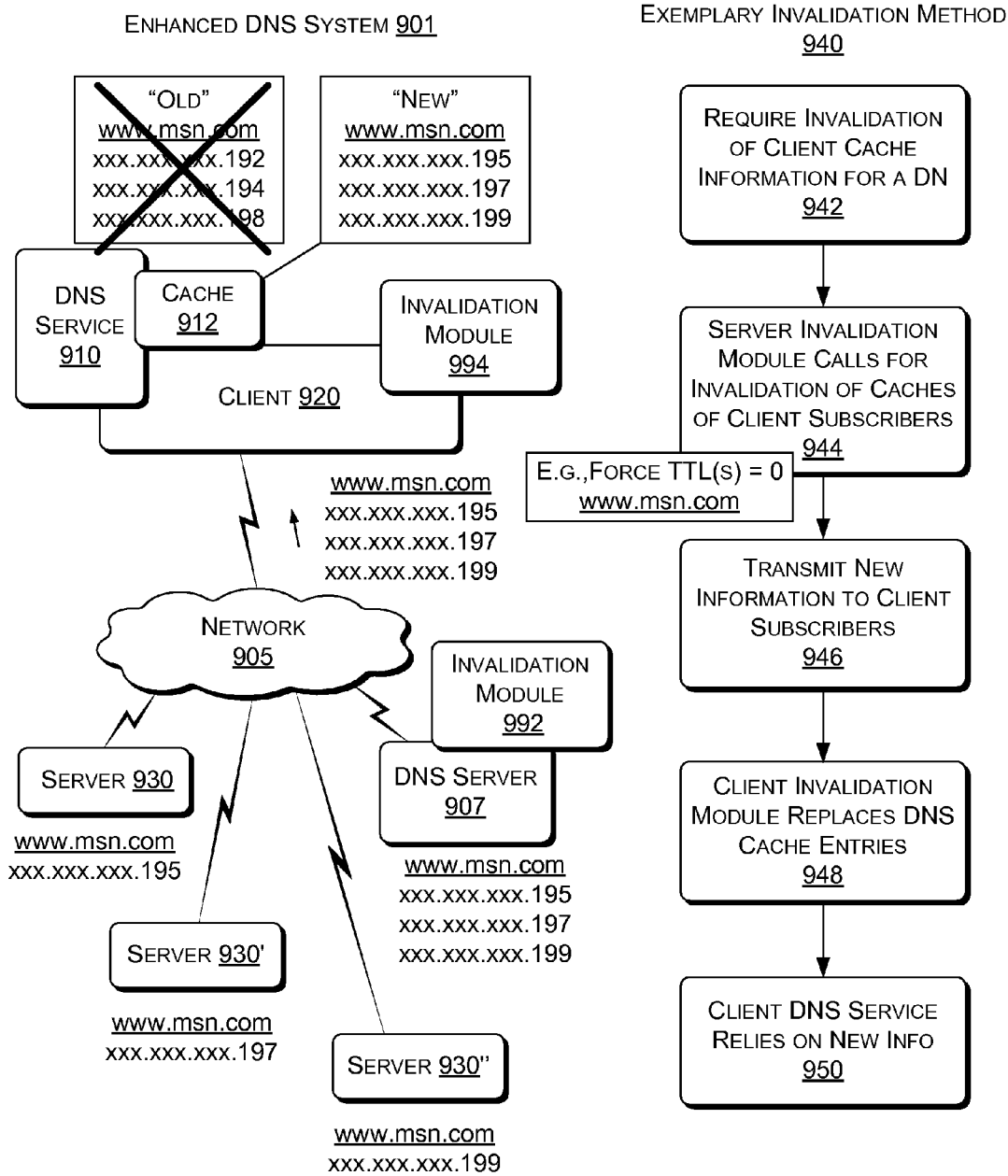
FIG. 9 is a diagram of an exemplary system and method for invalidating one or more entries in a client resolver cache (e.g., DNS cache)

FIG. 9 shows a Domain Name System (DNS) 901 with an exemplary client 920 and an exemplary invalidation method 940. The DNS 901 includes a network 905 (e.g., the Internet) and a DNS server 907 with a server-side invalidation module 992. The client 920 includes a DNS service 910, an associated cache 912 and a client-side invalidation module 994. In the example of FIG. 9, a domain name www.msn.com is geo-hosted (i.e., hosted by a plurality of servers in different geographical locations). Specifically, the domain name www.msn.com is hosted by a server 930 having an IP address xxx.xxx.xxx.195, a server 930' having an IP address xxx.xxx.xxx.197 and a server 930" having an IP address xxx.xxx.xxx.199.

According to the method 940, in a requirement block 942, notice is received for invalidation of client cache information for a domain name. In response, in a call block 944, the server-side invalidation module 992 calls for invalidation of caches of client subscribers. For example, the call block 944 may force client-side TTLs for a particular domain name to be changed to "0", which, in turn, may cause the client 920 to immediately request new information for the domain name.

In the example of FIG. 9, a transmit block 946 transmits new information to the subscribing clients. On the client side, per the replacement block 948, the invalidation module 994 may manage invalidation and updating by replacing a DNS cache entry or entries. At some subsequent time, per a request block 950, the client DNS service 910 requests resolution of the domain name and relies on the new information stored in the cache 912 to connect to a host server associated with the domain name.

An exemplary method can include bundling invalidation of information with updated information. For example, if A sends an invalidation instruction to B for invalidating information for a domain name, and A knows that B is going to issue a request to resolve the domain name, A can jump ahead in the process by sending its response (e.g., providing new or updated resolution information for the domain name) along with the invalidation instruction.

Figure 10:
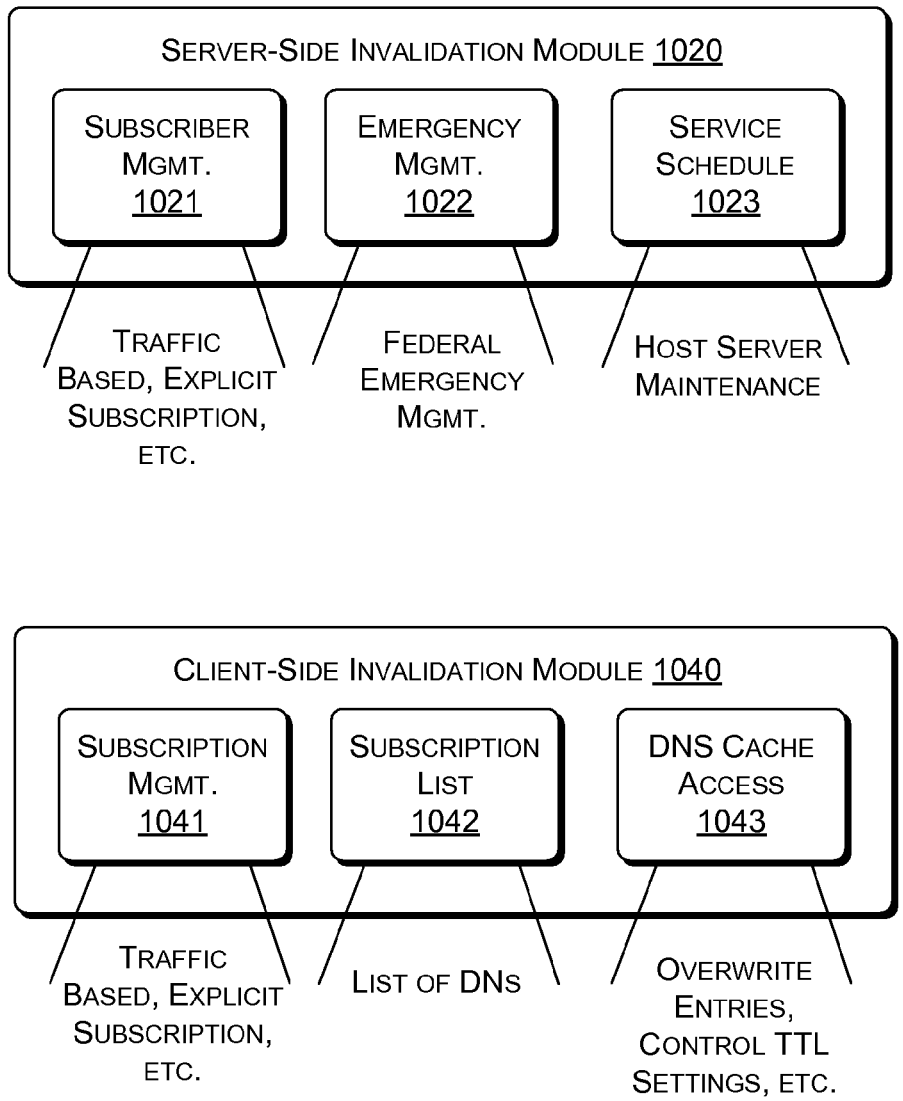
FIG. 10 is a diagram of exemplary invalidation modules.

FIG. 10 shows various components of an exemplary server-side invalidation module 1020 and various components of an exemplary client-side invalidation module 1040. As shown, the module 1020 may include a subscriber management component 1021 for managing client subscriber information. For example, a client may be automatically subscribed to an invalidation service based on traffic to a DNS server or a host server. Alternatively, a client may explicitly subscribe to an invalidation service. An emergency management component 1022 acts to respond to emergency information, for example, as provided by a governmental or intergovernmental agency. Consider a situation where an earthquake or other disaster causes a host server to be unavailable or congested. The component 1022 may respond to such information by invalidating client domain name information and replacing it, directly or indirectly, with new information (e.g., a host server at another location). A service schedule module 1023 may operate based on a host server maintenance schedule. For example, where a host server is scheduled to be shut down for maintenance or off-line for testing/upgrade, the component 1023 may respond to migrate clients to other host servers.

The client-side invalidation module 1040 includes a subscription management component 1041 that can subscribe a client or respond to server-side subscription management. A subscription list component 1042 allows a client to create a list of domain names for use by an invalidation service. A DNS cache access component 1043 allows an invalidation service to access a DNS cache for overwriting entries, controlling TTL settings, etc.

Figure 11:
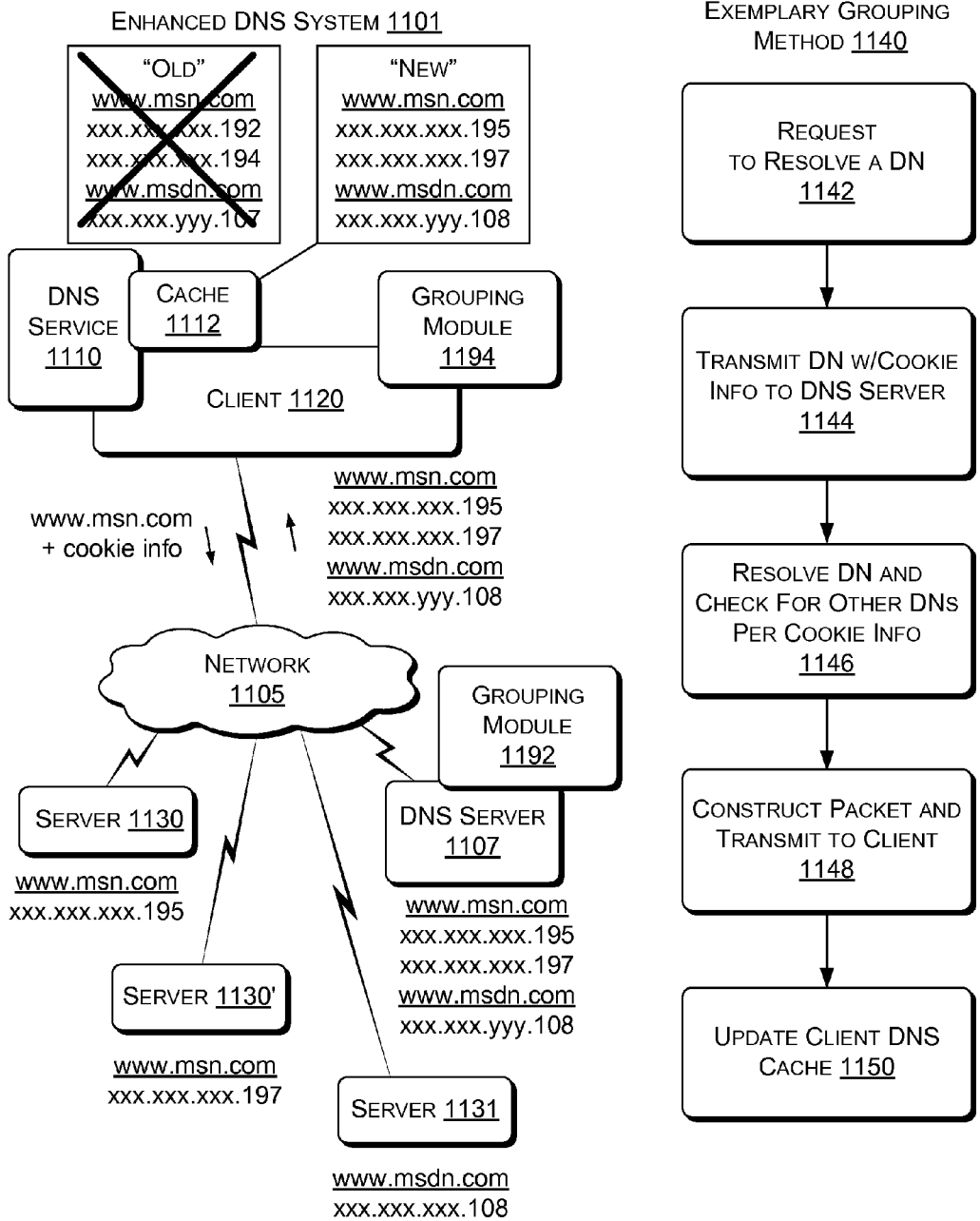
FIG. 11 is a diagram of an exemplary system and method for grouping domain names and receiving grouped domain name information.

FIG. 11 shows a Domain Name System (DNS) 1101 with an exemplary client 1120 and an exemplary grouping method 1140. The DNS 1101 includes a network 1105 (e.g., the Internet) and a DNS server 1107 with a server-side grouping module 1192. The client 1120 includes a DNS service 1110, an associated cache 1112 and a client-side grouping module 1194. In the example of FIG. 11, a domain name www.msn.com is hosted by a server 1130 having an IP address xxx.xxx.xxx.195 and a server 930' having an IP address xxx.xxx.xxx.197 while a domain name www.msdn.com is hosted by a server 1131 having an IP address xxx.xxx.xxx.108.

The method 1140 commences in a request block 1142 where a client requests resolution of a domain name. In a transmit block 1144, the client 1120 transmits the domain name with cookie information to the DNS server 1107 where the cookie information may be managed by the grouping module 1194. The DNS server 1107 resolves the domain name and the grouping module 1192 analyzes the cookie information to determine if the DN server 1107 should transmit information for one or more additional "group" domain names to the client 1120. Per a construction block 1148, the DNS server 1107 constructs a packet with domain name information for at least the request domain name. In an update block 1150, the client 1120 updates its cache 1112 with the information received from the DNS server 1107.

Figure 12:
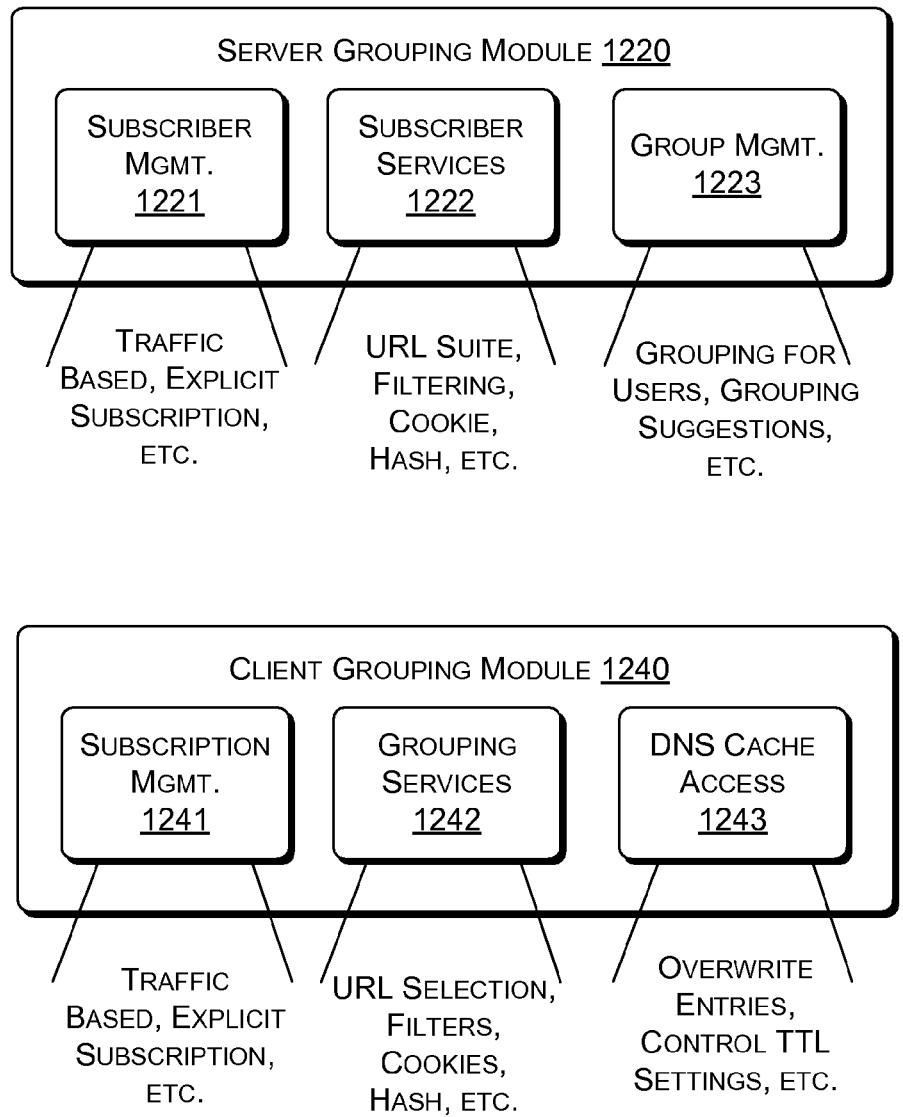
FIG. 12 is a diagram of exemplary grouping modules.

FIG. 12 shows various components of an exemplary server-side grouping module 1220 and various components of an exemplary client-side grouping module 1240. As shown, the module 1220 may include a subscriber management component 1221 for managing client subscriber information. For example, a client may be automatically subscribed to a grouping service based on traffic to a DNS server or a host server. Alternatively, a client may explicitly subscribe to a grouping service. A subscriber services component 1222 may allow a client to define a URL suite, filter criteria to group domain names, cookie use and associated parameters, use of a hash that compactly specifies a group of domain names, etc. A group management component 1223 may automatically group domain names for users or provide grouping suggestions, for example, based on usage patterns, etc.

The client-side grouping module 1240 includes a subscription management component 1241 that can subscribe a client or respond to server-side subscription management. A grouping services component 1242 can allow a user to select URLs, construct filters or specify filter criteria to group domain names, generate cookies, hash group information, etc. A DNS cache access component 1243 allows a grouping service to access a DNS cache for overwriting entries, controlling TTL settings, etc.

An exemplary method for grouping domain names and receiving group information upon issuing a name resolution request can include polling for changes. For example, a client may issue a request for resolution of a domain name and include a poll request for changes associated with a group of domain names. In response a receiving server may determine whether changes have occurred to any members of the group and transmit to the client information for only those members with changes.

An exemplary method optionally operates according to a cookie model where the client and server exchange a cookie. The cookie may be sent from a server to a client upon a request for resolution of a domain name. In turn, the grouping module on the client may store and populate the cookie with group information. Alternatively, a server may send a series of cookies to a client and the client-side grouping module may consolidate the cookies into a group cookie. Upon a request for resolution of a domain name in the group, the client may transmit the group cookie to the server. In turn, the grouping module on the server checks the change status of the domain name information for members of the group and returns updated information as appropriate.

An exemplary method optionally operates on an application specific basis. For example, a client may desire information for an email application and/or a messenger application. In such an example, a single request can update domain name information for both applications. In instances where a user coordinates communications using both applications, the user's experience of both applications can be enhanced.

An exemplary method optionally relies on filtering techniques to define domain name groups. For example, a user that access several governmental agencies may use a filter that includes ".gov" as a criterion. As described herein, other filtering techniques (e.g., with prefixes/suffixes, etc.) may be used. An exemplary method optionally relies on zone information, a SOA record, etc., to define group members.

Various exemplary grouping methods include client-server protocols to communicate information. An exemplary protocol optionally stores information in a packet according to a DNS protocol where a grouping module extracts the information for purposes of grouping domain names or receiving information about domain names in a group. Alternatively, a separate protocol is used where information may be extracted from a DNS packet, cache or file.

Figure 13:
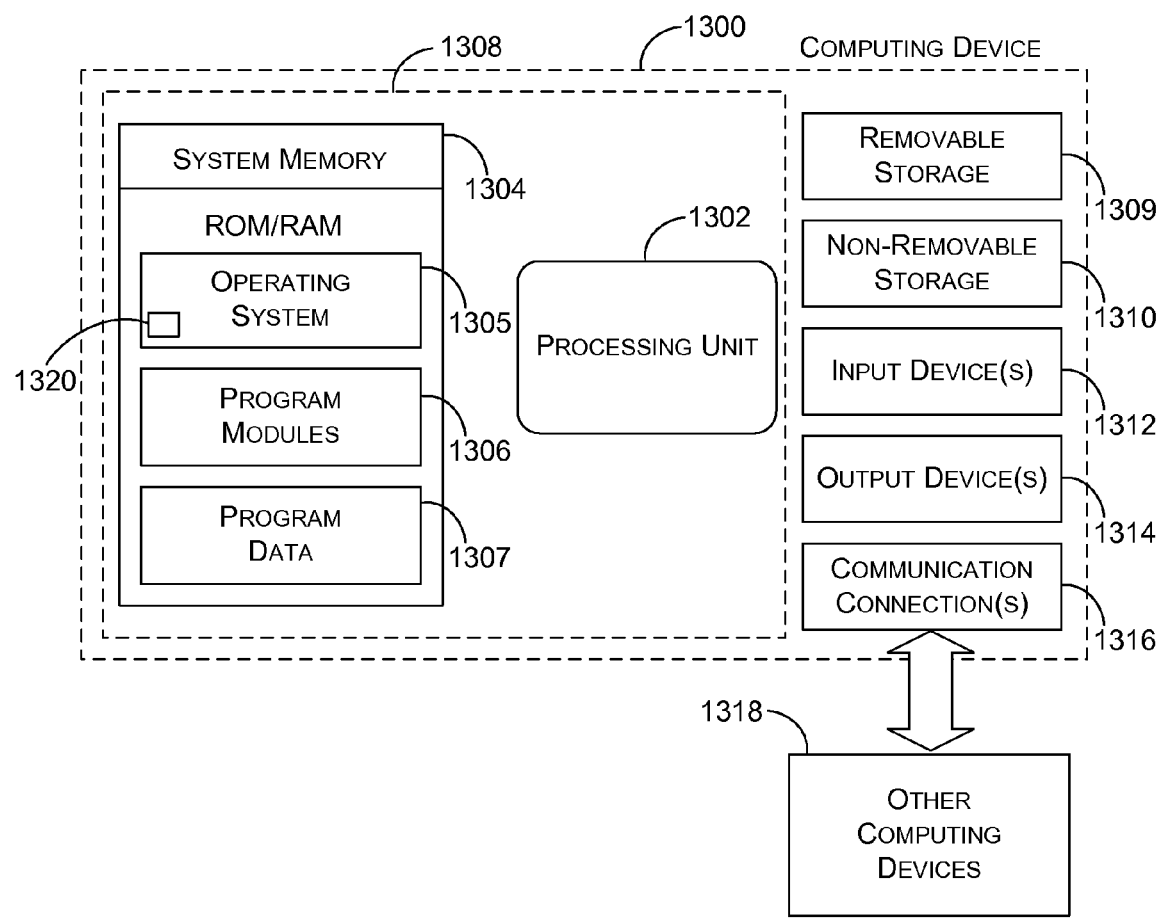
FIG. 13 is a diagram of an exemplary computing device.

FIG. 13 illustrates an exemplary computing device 1300 that may be used to implement various exemplary components and in forming an exemplary system. For example, the clients 420 or the servers 430 of the system of FIG. 4 may include various features of the device 1300.

In a very basic configuration, computing device 1300 typically includes at least one processing unit 1302 and system memory 1304. Depending on the exact configuration and type of computing device, system memory 1304 may be volatile (such as RAM), non-volatile (such as ROM, flash memory, etc.) or some combination of the two. System memory 1304 typically includes an operating system 1305, one or more program modules 1306, and may include program data 1307. The operating system 1305 include a component-based framework 1320 that supports components (including properties and events), objects, inheritance, polymorphism, reflection, and provides an object-oriented component-based application programming interface (API), such as that of the .NET™ Framework marketed by Microsoft Corporation, Redmond, Wash. The device 1300 is of a very basic configuration demarcated by a dashed line 1308. Again, a terminal may have fewer components but will interact with a computing device that may have such a basic configuration.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by removable storage 1309 and non-removable storage 1310. Computer storage media may include volatile and nonvolatile, removable and non-removable media implemented in any method or technology for storage of information, such as computer readable instructions, data structures, program modules, or other data. System memory 1304, removable storage 1309 and non-removable storage 1310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1300. Any such computer storage media may be part of device 1300. The computing device 1300 may also have input device(s) 1312 such as keyboard, mouse, pen, voice input device, touch input device, etc. Output device(s) 1314 such as a display, speakers, printer, etc. may also be included. These devices are well know in the art and need not be discussed at length here.

The computing device 1300 may also contain communication connections 1316 that allow the device to communicate with other computing devices 1318, such as over a network. Communication connections 1316 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by a computing device, the method comprising:
    booting the computing device;
    in response to the booting, accessing a file that comprises domain names; and
    resolving, by one or more hardware processing units of the computing device, at least one of the domain names by issuing a request to a server wherein the resolving occurs as a background process and the resolving prioritizes the domain names according to their respective frequency of access prior to the booting.

2. The method of claim 1 wherein the background process comprises a process decoupled from any user initiated request to resolve a domain name.

3. The method of claim 1 wherein the background process comprises a process decoupled from any user application initiated request to resolve a domain name.

4. The method of claim 1 wherein the background process commences in response to the booting.

5. The method of claim 1 wherein the background process commences in response to the accessing.

6. The method of claim 1 wherein the resolving causes updated information, associated with the domain names, to be stored locally on the computing device.

7. The method of claim 1 wherein the resolving selects the at least one of the domain names according to one or more priority criteria.

8. The method of claim 1 wherein the resolving further prioritizes the domain names according to their respective likelihood of being invalid on a future domain name resolution request.

9. The method of claim 1 wherein the accessing and the resolving occur as an operating system service.

10. One or more computer-readable hardware media comprising processor executable instructions to perform the accessing and the issuing of claim 1 as a background process.

11. A method, implemented by a Domain Name Service (DNS) server connected to clients of the DNS server via a network, the method comprising:
    receiving by the DNS server a notice to invalidate client DNS resolver cache information for a domain name;
    accessing a list of one or more client subscribers to an invalidation service for the domain name;
    issuing an instruction to the one or more client subscribers to invalidate their respective client DNS resolver cache information for the domain name; and
    triggering, by the DNS server, each of the one or more client subscribers to issue a request to resolve the domain name.

12. The method of claim 11 wherein the instruction comprises changing a time to live (TTL) for the domain name.

13. The method of claim 11 wherein the instruction comprises setting a time to live (TTL) for the domain name to zero.

14. The method of claim 11 wherein the issuing further comprises providing new resolution information for the domain name.

15. One or more computer-readable hardware media comprising processor-executable instructions to perform the method of claim 11.

16. A method comprising:
    receiving a request from a computing device to resolve a domain name;
    resolving, by one or more hardware processing units of the computing device, the domain name, wherein the resolving prioritizes a file comprising domain names according to their respective frequency of access prior to the computing device booting; and
    transmitting information for the resolved domain name and additional information for at least one other domain name.

17. The method of claim 16 wherein the at least one other domain name comprises a domain name associated with a group of client selected domain names.

18. One or more computer-readable hardware media comprising processor-executable instructions to perform the method of claim 16.

19. The method of claim 11 further comprising providing internet location coordinates (ILCs) for servers in response to requests to resolve the domain name.

* * * * *